(12) United States Patent
Hirakata

(10) Patent No.: US 9,336,727 B2
(45) Date of Patent: May 10, 2016

(54) DRIVING METHOD OF DISPLAY DEVICE

(75) Inventor: Yoshiharu Hirakata, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 787 days.

(21) Appl. No.: 13/302,065

(22) Filed: Nov. 22, 2011

(65) Prior Publication Data

US 2012/0133648 A1    May 31, 2012

(30) Foreign Application Priority Data

Nov. 30, 2010  (JP) ................................ 2010-267058

(51) Int. Cl.
*G09G 3/36* (2006.01)
*G06T 15/00* (2011.01)
*G09G 3/34* (2006.01)
*H04N 13/04* (2006.01)

(52) U.S. Cl.
CPC ........... *G09G 3/342* (2013.01); *H04N 13/0422* (2013.01); *H04N 13/0438* (2013.01); *H04N 13/0497* (2013.01); *G09G 3/3677* (2013.01); *G09G 2310/024* (2013.01); *G09G 2310/0235* (2013.01); *G09G 2320/0209* (2013.01)

(58) Field of Classification Search
CPC ................... G09G 2310/0235; G09G 3/3406; G09G 3/3413
USPC ..................... 345/690, 691, 88, 102
See application file for complete search history.

(56) References Cited

U.S. PATENT DOCUMENTS

| 6,046,787 A | 4/2000 | Nishiguchi |
| 6,239,453 B1 | 5/2001 | Yamada et al. |
| 6,314,248 B1 | 11/2001 | Ohmura et al. |
| 6,448,951 B1 * | 9/2002 | Sakaguchi et al. ............... 345/88 |
| 6,580,405 B1 | 6/2003 | Yamazaki et al. |

(Continued)

FOREIGN PATENT DOCUMENTS

| EP | 1271965 A | 1/2003 |
| EP | 1271966 A | 1/2003 |

(Continued)

OTHER PUBLICATIONS

Takeshi Nishi et al.; "Field-Sequential Blue-Phase Mode 2D/3D Display Applying Crystalline Oxide Semiconductor"; AM-FPD '11 Digest of Technical Papers; 2011; pp. 113-116.

(Continued)

*Primary Examiner* — Kumar Patel
*Assistant Examiner* — Afroza Chowdhury
(74) *Attorney, Agent, or Firm* — Fish & Richardson P.C.

(57) ABSTRACT

An object is to reduce crosstalk between consecutive frame periods. The writing period of image signals to each pixel and the lighting period of light sources corresponding to the image signals in one frame period are rearranged so that the lighting period of the light sources corresponding to the image signals does not overlap with a previous frame period and the next frame period, and the image signals are written and the light sources corresponding to the image signals are on. Specifically, a display region is divided into a plurality of regions, and each of the plurality of regions is divided for rows in a first half and rows in a latter half. The image signals written to the rows in the latter half are written in the previous frame period, and the light sources corresponding to the image signals are on in the frame period.

22 Claims, 19 Drawing Sheets

(56) References Cited

U.S. PATENT DOCUMENTS

| | | |
|---|---|---|
| 6,597,348 B1 | 7/2003 | Yamazaki et al. |
| 6,730,966 B2 | 5/2004 | Koyama |
| 6,873,311 B2 * | 3/2005 | Yoshihara et al. ............... 345/87 |
| 6,977,629 B2 | 12/2005 | Weitbruch et al. |
| 6,982,462 B2 | 1/2006 | Koyama |
| 7,045,369 B2 | 5/2006 | Yamazaki et al. |
| 7,317,438 B2 | 1/2008 | Yamazaki et al. |
| 7,345,661 B2 | 3/2008 | Miyagawa et al. |
| 7,385,579 B2 | 6/2008 | Satake |
| 7,385,625 B2 | 6/2008 | Ohmura et al. |
| 7,403,177 B2 | 7/2008 | Tanada et al. |
| 7,492,345 B2 | 2/2009 | Jin et al. |
| 7,525,119 B2 | 4/2009 | Koyama |
| 7,727,779 B2 | 6/2010 | Yamazaki et al. |
| 7,834,830 B2 | 11/2010 | Yamazaki et al. |
| 8,203,514 B2 * | 6/2012 | Su et al. ......................... 345/88 |
| 2001/0000335 A1 | 4/2001 | Yamada et al. |
| 2005/0062708 A1 * | 3/2005 | Yoshihara et al. ............... 345/96 |
| 2009/0141024 A1 | 6/2009 | Lee et al. |
| 2009/0218573 A1 | 9/2009 | Koyama |
| 2009/0237495 A1 | 9/2009 | Kawahara |
| 2009/0303219 A1 | 12/2009 | Kimura et al. |
| 2010/0127959 A1 * | 5/2010 | Su et al. .......................... 345/88 |
| 2010/0164856 A1 * | 7/2010 | Liao et al. ..................... 345/102 |
| 2010/0289969 A1 | 11/2010 | Yamazaki et al. |
| 2011/0025729 A1 | 2/2011 | Yamazaki et al. |
| 2011/0242100 A1 | 10/2011 | Yamazaki et al. |
| 2012/0127384 A1 | 5/2012 | Miyake et al. |
| 2012/0162286 A1 * | 6/2012 | Toyotaka ..................... 345/690 |

FOREIGN PATENT DOCUMENTS

| | | |
|---|---|---|
| JP | 2003-066920 A | 3/2003 |
| JP | 2003-259395 A | 9/2003 |
| JP | 2005-530196 | 10/2005 |
| JP | 2006-220685 A | 8/2006 |
| JP | 2007-264211 A | 10/2007 |
| JP | 2009-003319 A | 1/2009 |
| JP | 2009-031523 A | 2/2009 |
| JP | 2009-230071 A | 10/2009 |
| TW | 574824 | 2/2004 |
| TW | 200949809 | 12/2009 |
| TW | 201024798 | 7/2010 |
| WO | WO-2003/107083 | 12/2003 |

OTHER PUBLICATIONS

Taiwanese Office Action (Application No. 100143330) Dated Mar. 15, 2016.

* cited by examiner

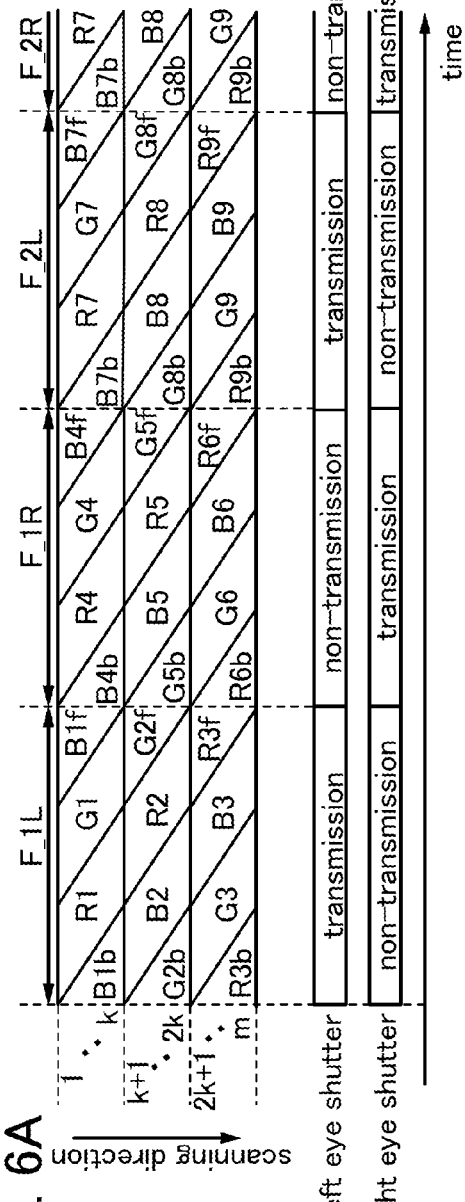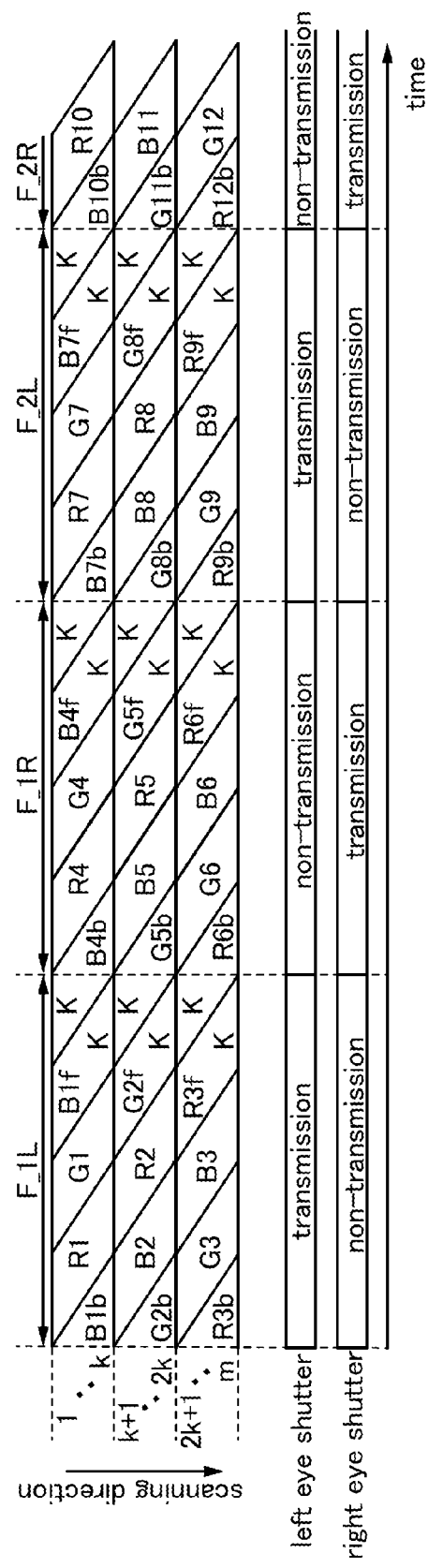

FIG. 9A
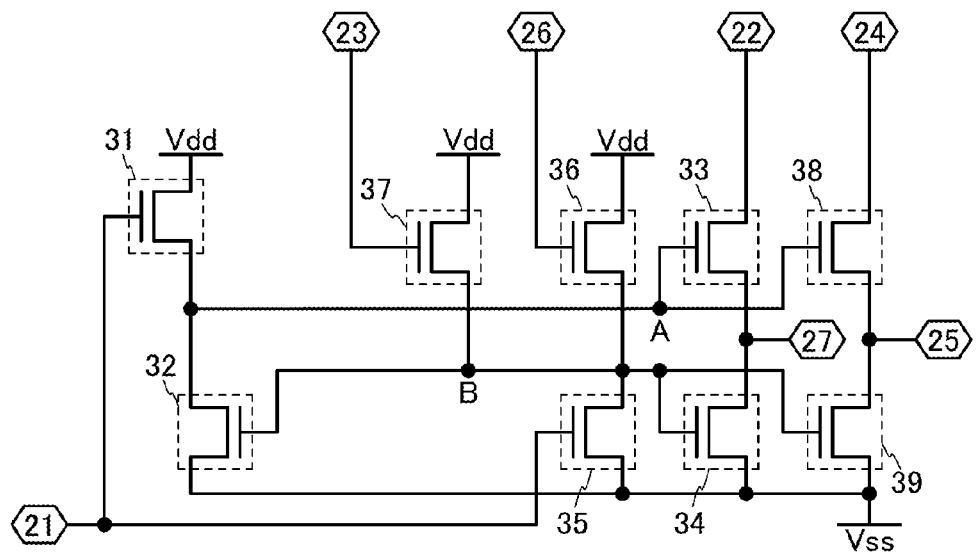
FIG. 9B    FIG. 9C    FIG. 9D
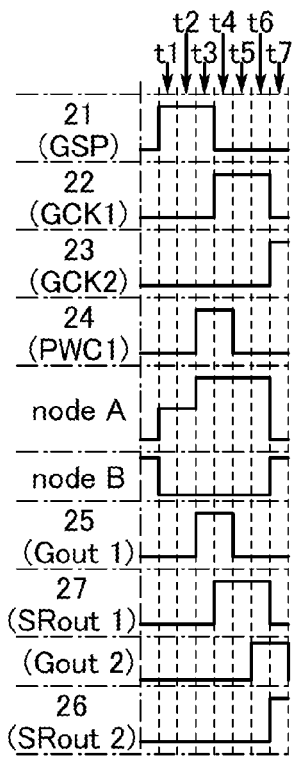 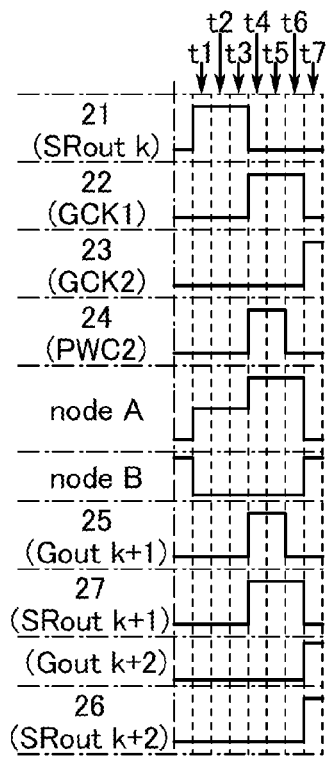 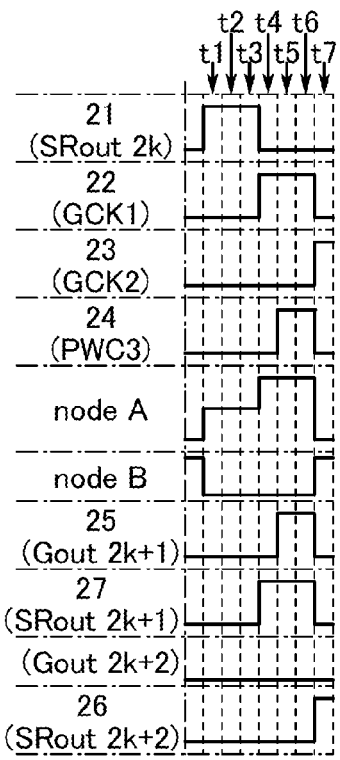

FIG. 14A1 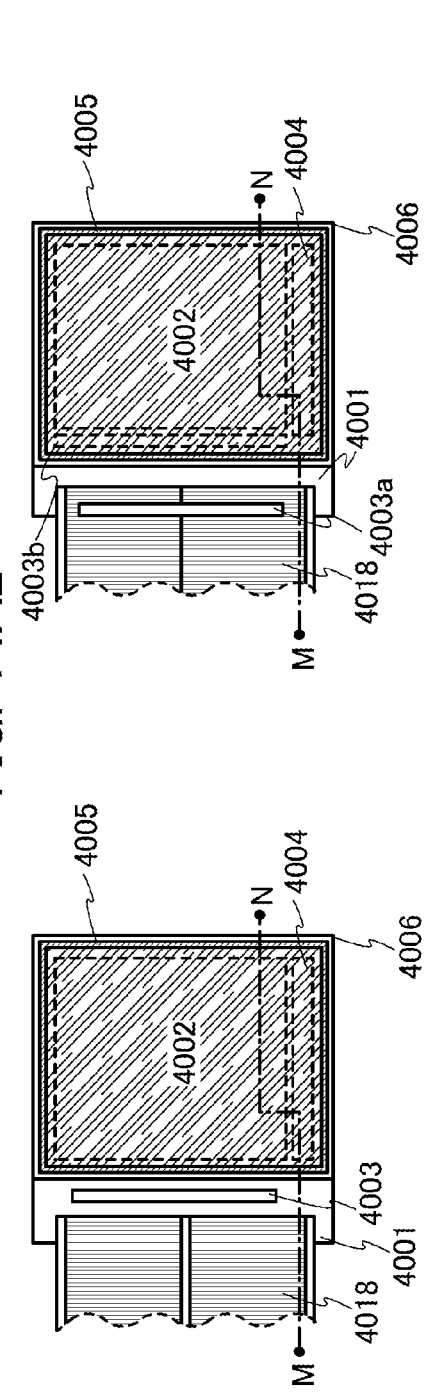
FIG. 14A2 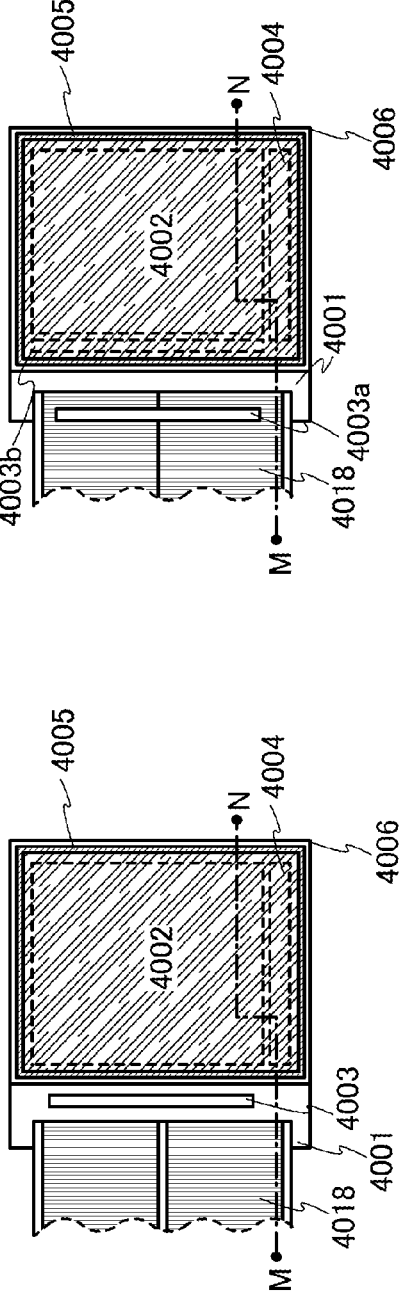

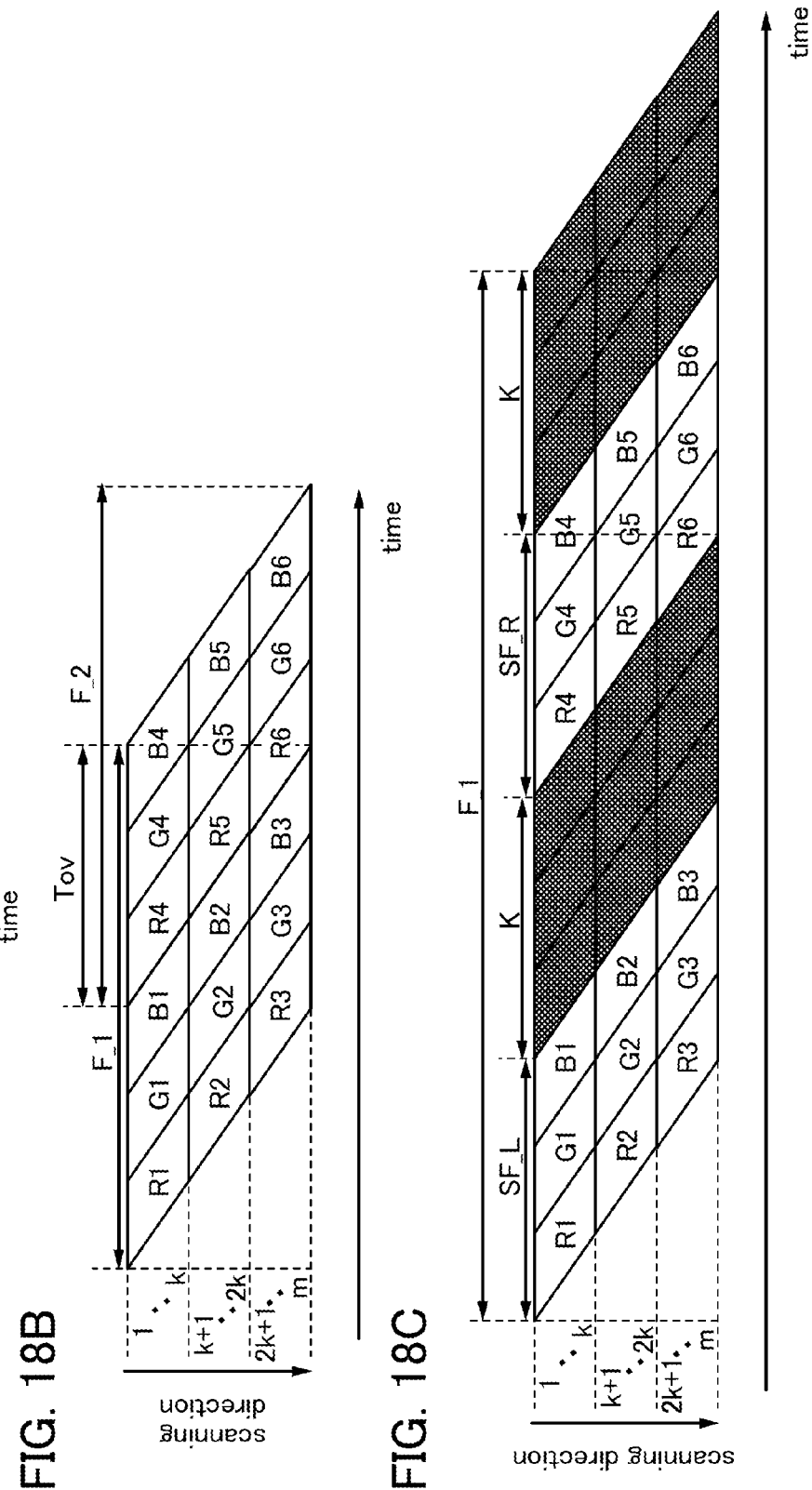

DRIVING METHOD OF DISPLAY DEVICE

BACKGROUND OF THE INVENTION

1. Field of the Invention

The present invention relates to a driving method of a display device, in particular, a driving method of a liquid crystal display device using a liquid crystal element for a display element.

2. Description of the Related Art

Display devices typified by liquid crystal display devices, ranging from large display devices such as television receivers to small display devices such as mobile phones, have been spreading. From now on, products with higher added values will be needed and are being developed. In recent years, in view of increase in concern about global environment and improvement in convenience of mobile devices, development of display devices with low power consumption has attracted attention.

As a display device with low power consumption, there is a display device which displays an image by a field sequential system (also referred to as a color sequential display method, a time-division display method, or a successive additive color mixture display method). In the field sequential system, lighting of backlights of red (hereinafter also abbreviated to R in some cases), green (hereinafter also abbreviated to G in some cases), and blue (hereinafter also abbreviated to B in some cases) are switched with time, lights of R, G, and B are supplied to a display panel, and color images are seen by an additive color mixture. Thus, it is not necessary to provide a color filter in each pixel, the use efficiency of transmitting light from a backlight can be improved, and power consumption can be reduced. Since R, G, and B can be expressed in one pixel in a field sequential display device, the field sequential display device has an advantage that high-resolution images can be easily displayed.

The driving by a field sequential system has a unique problem of a display defect such as color breakup (also referred to as color break). It is known that the color breakup can be reduced in such a way that the number of writing cycles of image signals in a certain period is increased.

Patent Document 1 discloses a structure in which, in order to increase the number of writing cycles of image signals in a certain period in a field sequential liquid crystal display device, a display region is divided into a plurality of regions, and a backlight unit is also divided into a plurality of corresponding regions.

In addition, Patent Document 2 discloses a structure configured to display a stereoscopic image (three-dimensional image) in a field sequential liquid crystal display device.

REFERENCE

[Patent Document 1] Japanese Published Patent Application No. 2006-220685

[Patent Document 2] Japanese Published Patent Application No. 2003-259395

SUMMARY OF THE INVENTION

In the structure of Patent Document 1, a display region is divided into a plurality of regions to which image signals of different colors are supplied, and driving by a field sequential system is performed. In addition, a backlight unit corresponding to the plurality of regions of the display region is also divided into a plurality of regions, and the light emission of the backlight unit is performed using different colors in adjacent regions. Note that driving of a backlight unit when a display region is divided into a plurality of regions to which image signals of different colors are supplied and a light source of the backlight unit is also divided into a plurality of regions corresponding to the plurality of regions of the display region to perform driving by a field sequential system is referred to as color scan backlight driving (or scan backlight driving).

By the color scan backlight driving, while red (R) image signals are sequentially written in a plurality of regions, green (G) image signals and blue (B) image signals are written from the regions to which the R image signals have been written.

Here, in order to describe an object of one embodiment of the present invention, the color scan backlight driving will be described with reference to FIGS. 17A and 17B and FIGS. 18A to 18C.

FIG. 17A is a schematic view of writing of image signals and lighting of light sources corresponding to a region to which the image signals have been written. In FIG. 17A, selection signals are sequentially supplied to a plurality of scan lines (also referred to as gate lines) in a direction (scanning direction) where the plurality of scan lines is provided, so that a state of writing of image signals of signal lines (also referred to as data lines) to pixels and a state of lighting of the light sources are illustrated. In FIG. 17A, a state in which writing of the image signals and lighting of the light sources are performed as time passes is illustrated.

In FIG. 17A, a heavy line 1501 represents writing of image signals, and a region shown by an oblique hatching 1502 illustrates the sum of a response period of liquid crystals and a lighting period of the light sources. In addition, "R1" which overlaps with the heavy line 1501 represents writing of the red image signals, whereas the term "R1" which overlaps with the oblique hatching 1502 represents lighting of red light sources.

Note that in FIG. 17A, the lighting of the red light sources in "R1" overlapped with the oblique hatching 1502 may be performed in such a way that the red light sources are turned on uniformly in the region to which the red image signals have been written. Note that the lighting of the light sources may also be performed in such a way that luminance of the light sources is adjusted in accordance with the gray scales of the image signals, which is preferable to reduce power consumption and improve contrast.

FIG. 17B illustrates color scan backlight driving in consecutive frame periods, using a state in which the writing of the image signals and the lighting of the light sources described in FIG. 17A. FIG. 17B illustrates a state in which in scan lines are provided in first to k-th rows, (k+1)-th to 2k-th rows, and (2k+1)-th to m-th rows (k is a natural number greater than or equal to 2, and in is a natural number greater than or equal to 3k) in a scanning direction as an example. Note that in FIG. 17B, a region of pixels to which the image signals are written by scanning of the scan lines of the first to k-th rows represents a first region. Further, in FIG. 17B, a region of pixels to which the image signals are written by scanning of the scan lines of the (k+1)-th to 2k-th rows represents a second region. In addition, in FIG. 17B, a region of pixels to which the image signals are written by scanning of the scan lines of the (2k+1)-th to m-th rows represents a third region. Note that each of the first to third regions is divided into two parts because rows in a first half and rows in a latter half are separately described in some cases.

In the first region illustrated in FIG. 17B, first R image signals R1 configured to perform color display in the first region are written and light sources of R1 are turned on, first G image signals G1 are written and light sources in G1 are turned on, and first B image signals B1 are written and light sources in B1 are turned on. In the first region, color display can be performed by an additive color mixture using the first image signals R1, G1, and B1 and lighting of the light sources corresponding to the image signals. Note that the oblique hatching which represents lighting of the light sources illustrated in FIG. 17B is illustrated by hatching patterns which are different per color of the light source to be turned on.

In the second region, after writing of the image signals RI is completed in the first region, second R image signals R2 configured to perform color display are written and light sources in R2 are turned on, second G image signals G2 are written and light sources in G2 are turned on, and second B image signals B2 are written and light sources in B2 are turned on in the second region. Similarly, in the third region, after writing of the image signals R2 is completed in the second region, third R image signals R3 configured to perform color display are written and light sources in R3 are turned on, third G image signals G3 are written and light sources in G3 are turned on, and third B image signals B3 are written and light sources in B3 are turned on in the third region.

A period in which the color display is performed by an additive color mixture in the first to third regions is referred to as a frame period configured to display one image in a display region. Therefore, a period from writing of the first R image signals R1 to the first region to the lighting of the light sources in B3 in the third region is referred to as a frame period, and the frame period is referred to as a first frame period F_1.

As in the first frame period F_1, fourth R image signals R4 configured to perform color display in the first region are written and light sources in R4 are turned on, fourth G image signals G4 are written and light sources in G4 are turned on, and fourth B image signals B4 are written and light sources in B4 are turned on in the first region. Similarly, image signals are written and the light sources are turned on in the second region and the third region; as for the writing of image signals and lighting of light sources in the first to third regions, a frame period from writing of the fourth R image signals R4 in the first region to the lighting of light sources in B6 in the third region is referred to as a frame period, and the frame period is referred to as a second frame period F_2 (partly not illustrated).

A period Tov in which the first frame period F_1 and the second frame period F_2 illustrated in FIG. 17B overlap with each other in displaying one image is generated. The period Tov in which the first frame period F_1 and the second frame period F_2 overlap with each other causes crosstalk between consecutive frames when a stereoscopic image is displayed. In particular, when an image is seen through glasses having a shutter means in the case where a stereoscopic image is displayed by a frame sequential method as in Patent Document 2, crosstalk between right and left images is generated, and separation of the right and left images becomes difficult.

Further, in FIGS. 18A to 18C, color scan backlight driving is described using schematic views which are different from those in FIGS. 17A and 17B.

FIG. 18A is a schematic view of writing of image signals and lighting of light sources corresponding to regions to which the image signals are written, which is different from that in FIG. 17A. In FIG. 18A, an oblique side 1601 represents writing of image signals by scan lines is performed sequentially in a scanning direction, and "R1" illustrated within a framework means that the image signals are red image signals. Further, FIG. 18A illustrates the state in which lighting of light sources corresponding to the image signals "R1" illustrated within the framework is performed after the writing of the image signals by the scan lines.

FIG. 18B illustrates color scan backlight driving in consecutive frame periods by using a state in which the writing of the image signals and the lighting of the light sources described in FIG. 18A are performed, and illustrates the same driving as that in FIG. 17B.

As in FIG. 17B, the period Toy in which the first frame period F_1 and the second frame period F_2 overlap with each other in displaying one image by an additive color mixture in the first to third regions illustrated in FIG. 18B is provided. Since the period Toy in which the first frame period F_1 and the second frame period F_2 overlap with each other exists as described above, separation of the right and left images becomes difficult when an image is seen through glasses having a shutter means in the case where a stereoscopic image is displayed by a frame sequential method.

As in FIG. 18B, FIG. 18C illustrates one frame period by color scan backlight driving in the case where a stereoscopic image is displayed. FIG. 18C is different from FIG. 18B in that one frame period F_1 in which the first frame period F_1 is referred to as a sub-frame period SF_L for a left eye configured to display an image for seeing with the left eye, the second frame period F_2 of FIG. 18B is referred to as a sub-frame period SF_R for a right eye in FIG. 18C configured to display an image for seeing with the right eye, and a sub-frame period K for a black image configured to display a black image is provided between the sub-frame period for the left eye SF_L and the sub-frame period for the right eye SF_R is provided. With the structure of FIG. 18C the period Tov in which the first frame period F_1 and the second frame period F_2 overlap with each other is removed, so that crosstalk between right and left images when an image is seen through glasses having a shutter means in the case where a stereoscopic image is displayed by a frame sequential method can be removed.

However, as illustrated in FIG. 18C, it is necessary for a structure in which a black image is provided between sub-frame periods and an image for seeing with right and left eyes is displayed to accelerate the writing speed of image signals in order to display a moving image without a blink (flicker). Therefore, sufficient time for writing image signals cannot be obtained, which causes display defects.

Thus, an object of one embodiment of the present invention is to provide a driving method of a display device in which display defects such as crosstalk between consecutive frames are reduced in consecutive frame periods.

In addition, an object of one embodiment of the present invention is to provide a driving method of a display device in which crosstalk between right and left images is reduced when the right and left images are switched and a stereoscopic image is displayed.

One embodiment of the present invention is to rearrange the writing period of the image signals to each pixel and the lighting period of light sources corresponding to the image signals in one frame period so that the lighting period of the light sources corresponding to the image signals does not overlap with a previous frame period and the next frame period, and to write the image signals and turn on the light sources corresponding to the image signals. Specifically, a display region is divided into a plurality of regions, and each of the plurality of regions is divided for rows in a first half and rows in a latter half. The image signals written to the rows in the latter half are written in the previous frame period, and the light sources corresponding to the image signals are on in the frame period.

One embodiment of the present invention is a driving method of a display device including a frame period for displaying an image in a display region, and the frame period includes first to third sub-frame periods in each of which writing of an image signal and lighting of a light source are performed. The driving method includes the steps of: in the third sub-frame period, writing the image signal by a scan line and turning on the light source corresponding to the image signal in a row in a first half in the display region, and writing the image signal by the scan line in a row in a latter half in the display region; and in the first sub-frame period, turning on the light source corresponding to an image signal written by the scan line to the row in the latter half in the display region in the third sub-frame period of a frame period just before the frame period.

One embodiment of the present invention is a driving method of a display device, including the steps of: dividing a display region into a plurality of regions, selecting any one of scan lines in each of the plurality of regions at the same time per region, and performing display; including a frame period for displaying an image in the display region, the frame period including first to third sub-frame periods in which writing of an image signal of any one color element of a plurality of color elements and lighting of a light source corresponding to the one color element are performed; writing the image signal corresponding to lighting so that the lighting of the light source in the first, second, and third sub-frame periods exhibits different color elements in each of the plurality of regions; in the third sub-frame period in the frame period, writing the image signal by the scan line and turning on the light source corresponding to the image signal in a row in a first half in each of the plurality of regions, and writing the image signal by the scan line in a row in a latter half in each of the plurality of regions; and in the first sub-frame period in the frame period, turning on the light source corresponding to an image signal written by the scan line to the row in the latter half in each of the plurality of regions in the third sub-frame period of a frame period just before the frame period.

According to one embodiment of the present invention, a driving method of a display device in which the third sub-frame period is a sub-frame period adjacent to the next frame period may be used.

One embodiment of the present invention is a driving method of a display device, including the steps of: dividing a display region into a plurality of regions, selecting any one of scan lines in each of the plurality of regions at the same time per region, and performing display; including a frame period for displaying an image in the display region, the frame period including first to fourth sub-frame periods in which writing of an image signal of any one color element of a plurality of color elements and lighting of a light source corresponding to the one color element are performed; writing the image signal corresponding to lighting so that the lighting of the light source in the first, second, third, and fourth sub-frame periods exhibits different color elements in each of the plurality of regions; in the third sub-frame period in the frame period, writing the image signal by the scan line and turning on the light source corresponding to the image signal in a row in a first half in each of the plurality of regions, and writing the image signal for black display by the scan line in a row in a latter half in each of the plurality of regions; in the fourth sub-frame period in the frame period, writing the image signal for black display by the scan line and turning off the light source in the row in the first half in each of the plurality of regions, and writing the image signal by the scan line in the row in the latter half in each of the plurality of regions; and in the first sub-frame period in the frame period, turning on the light source corresponding to an image signal written by the scan line to the row in the latter half in each of the plurality of regions in the fourth sub-frame period of a frame period just before the frame period.

According to one embodiment of the present invention, a driving method of a display device in which the fourth sub-frame period is a sub-frame period adjacent to the next frame period may be used.

According to one embodiment of the present invention, a driving method of a display device in which the first sub-frame period is a sub-frame period adjacent to the next frame period may be used.

According to one embodiment of the present invention, a driving method of a display device in which, as the lighting of the light source in the frame period, only lighting of the light source corresponding to the image signal for displaying an image in the frame period is performed may be performed.

According to one embodiment of the present invention, a driving method of a display device in which the light sources are light sources of red, green and blue may be used.

According to one embodiment of the present invention, display defects such as crosstalk between consecutive frames can be reduced in consecutive frame periods.

Further, according to one embodiment of the present invention, crosstalk between the right and left images can be reduced when the right and left images are switched and a stereoscopic image is displayed.

BRIEF DESCRIPTION OF THE DRAWINGS

FIGS. 6A and 6B are diagrams to describe Embodiment 3.
FIGS. 9A to 9D are diagrams to describe Embodiment 4.
FIGS. 14A1, 14A2, and 14B are diagrams to describe Embodiment 6.
FIGS. 18A to 18C are diagrams to describe an object.

DETAILED DESCRIPTION OF THE INVENTION

Figure 1A:
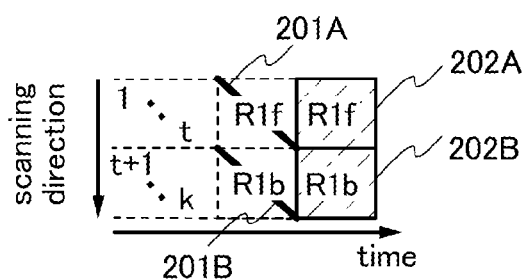
FIGS. 1A and 1B are diagrams to describe Embodiment 1.

Hereinafter, embodiments of the present invention will be described with reference to the accompanying drawings. However, the present invention can be carried out in many different modes, and it is easily understood by those skilled in the art that modes and details of the present invention can be modified in various ways without departing from the spirit and the scope of the present invention. Therefore, the present invention should not be construed as being limited to the following description of the embodiments. Note that in structures of the present invention described below, reference numerals denoting the same portions are used in common in different drawings.

Note that, the size, layer thickness, and signal waveform of each object illustrated in the drawings and the like in the embodiments are exaggerated for simplicity in some cases. Therefore, embodiments of the present invention are not limited to such scales.

Note that terms of "first, second, third to n-th (n is a natural number)" used in this specification is used just for preventing confusion of components, and do not limit to the amount of components.

(Embodiment 1)

In this embodiment, a method for driving a display device in one embodiment of the present invention will be described.

FIG. 1A is a schematic view of writing of image signals and lighting of light sources corresponding to regions to which the image signals have been written. In FIG. 1A, selection signals are sequentially supplied to a plurality of scan lines (also referred to as gate lines) in a direction (scanning direction) where the plurality of scan lines is provided, so that a state of writing of image signals of signal lines (also referred to as data lines) to pixels and a state of lighting of the light sources are illustrated. In FIG. 1A, a state in which writing of the image signals to the pixels of the first to t-th rows (l is a natural number smaller than k) and the pixels of the (t+1)-th to k-th rows and lighting of the light sources are performed as time passes is illustrated.

Although light sources of three colors (R (red), G (green), and B (blue)) are used in this embodiment, a light source of another color may be combined. For example, in addition to the light sources of three colors (RGB), a light-emitting diode of yellow, magenta, or cyan or the like may be used. In addition to the light sources of three colors (RGB), a white light-emitting diode can be combined.

In this embodiment, writing of an image signal means that a selection signal, for example, a high-level potential is supplied to a scan line to turn on a transistor in a pixel which is connected to the scan line and an image signal of a signal line is supplied to a pixel electrode in the pixel.

In FIG. 1A, a heavy line 201A and a heavy line 201B each represent writing of image signals, and regions shown by an oblique hatching 202A and an oblique hatching 202B each illustrate the sum of a response period of liquid crystals and a lighting period of the light sources. In addition, "R1f" which overlaps with the heavy line 201A represents writing of red image signals to pixels selected by signals of the scan lines of the first to t-th rows which are rows in the first half of one region, here, the region corresponding to the scan lines of the first to k-th rows. In addition, "R1b" which overlaps with the heavy line 201B represents writing of red image signals to pixels selected by signals of the scan lines of the (t+1)-th to k-th rows which are rows in the latter half of one region, here, the region corresponding to the scan lines of the first to k-th rows. Note that FIG. 1A illustrates a state in which writing of the image signals Rl f shown by the heavy line 201A and writing of the image signals R1b shown by the heavy line 201B are performed at the same time. Note that a period in which writing of the image signals is performed and a period in which lighting of the light sources is performed illustrated in FIG. 1A are a sub-frame period that forms one frame period.

In addition, "R1f" which overlaps with the oblique hatching 202A represents lighting of the red light sources corresponding to the scan lines of the first to t-th rows which are rows in the first half of one region, here, the region corresponding to scan lines of the first to k-th rows. In addition, "R1b" which overlaps with the oblique hatching 202B represents lighting of the red light sources corresponding to the scan lines of the (t+1)-th to k-th rows which are rows in the latter half of one region, here, the region corresponding to the scan lines of the first to k-th rows. Note that FIG. 1A illustrates a state in which lighting of light sources in R1f shown by the oblique hatching 202A and lighting of the light sources in R1b shown by the oblique hatching 202B are performed at the same time.

Figure 17A:
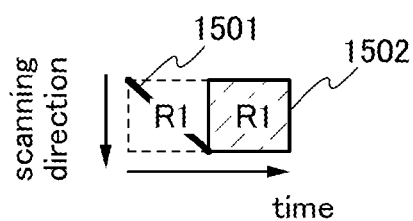
FIGS. 17A and 17B are diagrams to describe an object.
Figure 17B:
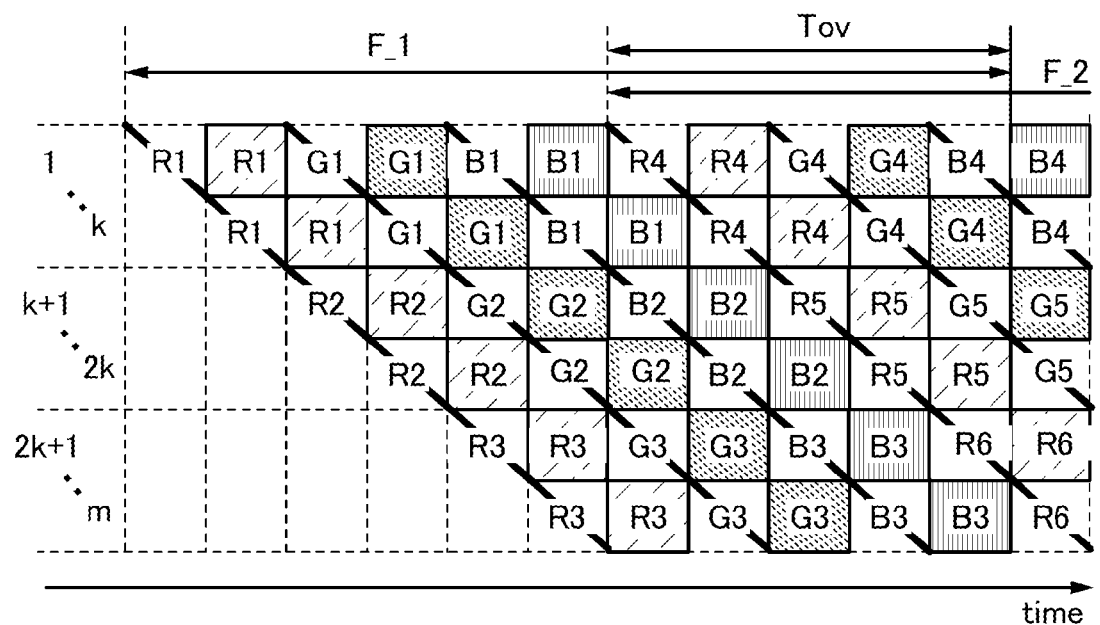

Note that as for "R1" which overlaps with the heavy line 201A and the heavy line 201B and "R1" which overlaps with the oblique hatching 202A and the oblique hatching 202B, description with reference to FIG. 17A can be referred to.

In FIG. 1A, lighting of the red light sources corresponding to the image signals "R1f" is shown as "R1f". Lighting of the light sources in "R1f" may be performed in such a mariner that the red light sources are turned on uniformly. Note that lighting of the light sources may be performed in such a manner that luminance of the light sources is adjusted in accordance with gray scales of the image signals, and this case is preferable for low power consumption and improvement in contrast.

Note that FIG. 1A illustrates a period of writing of the image signals and a period of lighting of the light sources which are set in different periods from each other; however, these periods can partly overlap with each other. As an example, description will be made using FIG. 19 which is illustrated in the same manner as that of FIG. 1A.

Figure 19:
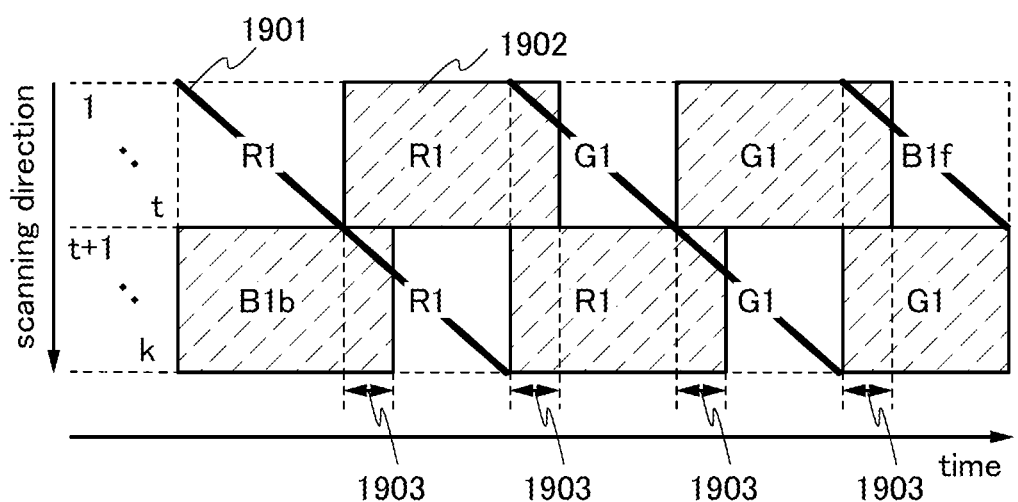
FIG. 19 is a diagram to describe Embodiment 1.

In FIG. 19, a heavy line 1901 represents writing of image signals, and a region shown by an oblique hatching 1902 represents lighting of light sources. FIG. 19 is different from FIG. 1A in that there is a period 1903 in which the heavy line 1901 and the oblique hatching 1902 overlap with each other.

The writing of the image signals shown by the heavy line 1901 in FIG. 19 is actually performed through the following steps: a step in which a high-level potential is supplied to the scan lines; next, a step in which the image signals of the signal lines are supplied to pixel electrodes through transistors in pixels; and a step in which alignment of liquid crystals is changed in accordance with an electric field generated between the pixel electrodes and counter electrodes. In the series of steps, a certain period is required due to charging and discharging of charge in the scan lines, charging and discharging of the pixel electrodes, or the like. In other words, there is a period when, the alignment of the liquid crystals is not changed in accordance with the electric field generated between the pixel electrodes and the counter electrodes until the alignment of the liquid crystals is changed by next writing of the image signals. In the period, the light source may emit light.

Therefore, even when the period shown by the heavy line 1901 in which writing of the image signals is performed and the period shown by the oblique hatching 1902 in which lighting of the light sources is performed overlap with each other, the image to be seen is not updated to the image corresponding to the next image signal to be written. Therefore, a lighting period of the light sources can be extended by the period 1903, so that luminance can be improved.

Note that the oblique hatching 1902 is the sum of the response period of the liquid crystals and the lighting period of the light sources as described above; in that case, a minimum response period of the liquid crystals is longer than the period 1903. In other words, each of the minimum response periods of the liquid crystals indicated by respective oblique hatchings 1902 is also longer than the period 1903; therefore, the lighting of the light sources in the oblique hatching 1902 starts after the period 1903. Therefore, the lighting period of the light sources in the oblique hatching 1902 is preferably provided so that the lighting period of the region corresponding to the scan lines of the first to t-th rows and the lighting period of the region corresponding to the scan lines of the (t+1)-th to k-th rows do not overlap with each other.

Figure 1B:
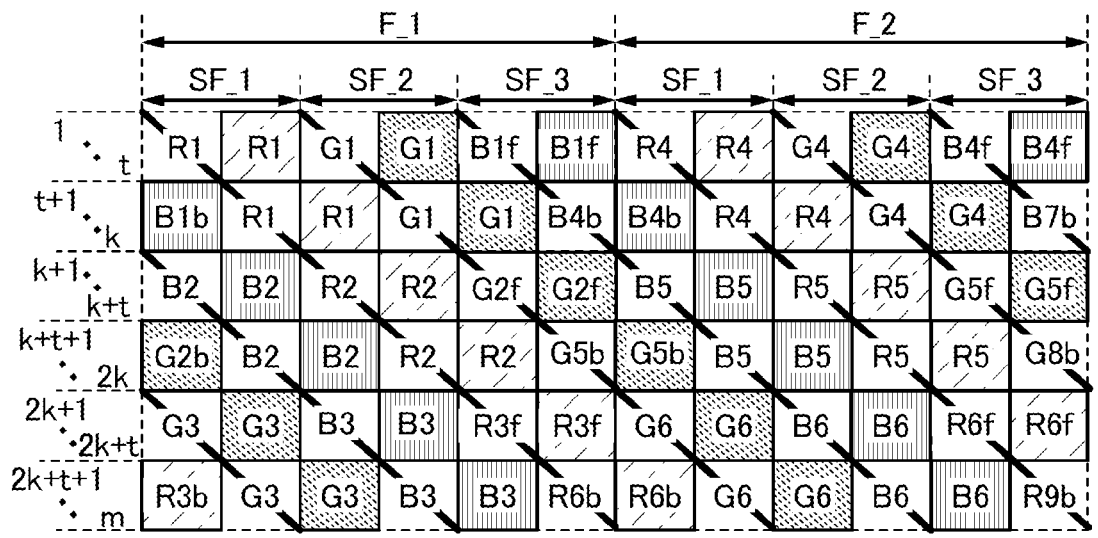

Next, a driving method of a display device of this embodiment will be described. FIG. 1B illustrates operation in consecutive frames using the writing period of the image signals and the sum of the response period of the liquid crystals and the lighting period of the light sources described in FIG. 1A. FIG. 1B illustrates a state in which m scan lines are provided in first to k-th rows, (k+1)-th to 2k-th rows, and (2k+1)-th to m-th rows (m is a natural number greater than or equal to 3k) in a scanning direction as an example.

In FIG. 1B, a region of pixels to which image signals are written by scanning of the scan lines of the first to k-th rows is referred to as a first region. In addition, in FIG. 1B, a region of pixels to which image signals are written by scanning of the scan lines of the (k+1)-th to 2k-th rows is referred to as a second region. Further, in FIG. 1B, a region of pixels to which image signals are written by scanning of the scan lines of the (2k+1)-th to m-th rows is referred to as a third region. Note that for description, the first region is divided into the first to t-th rows which are rows in the first half and the (t+1)-th to k-th rows which are rows in the latter half. In addition, for description, the second region is divided into the (k+1)-th to (k+t)-th rows which are rows in the first half and the (k+t+1)-th to 2k-th rows which are rows in the latter half Further, for description, the third region is divided into the (2k+1)-th to (2k+t)-th rows which are rows in the first half and the (2k+t+1)-th to m-th rows which are rows in the latter half Note that in the first frame period F_1 in FIG. 1B, RGB image signals which are written for performing display in the first region are referred to as the first image signals R1, G1, and B1, respectively; and the lightings of the light sources corresponding to the first image signals R1, G1, and B1 are referred to as lightings of the light sources of R1, G1, and B1, respectively. Note that the period in which the first image signals R1 (G1 and B1) are written to the rows in the first half of the first region and the period in which the light sources in R1 (G1 and B1) are on illustrated in FIG. 1B become a first sub-frame period SF_1 (a second sub-frame period SF_2 and a third sub-frame period SF_3).

In addition, the image signals which are written for performing display in the second region and the third region in the first frame period F_I in FIG. 1B are referred to as the second image signals R2, G2, and B2 and the third image signals R3, G3, and B3.

Note that in the second frame period F_2 in FIG. 1B, the RGB image signals which are written for performing display in the first region are referred to as the fourth image signals R4, G4, and B4, respectively; and the lightings of the light sources corresponding to the fourth image signals R4, G4, and B4 are referred to as lightings of the light sources in R4, G4, and B4. Similarly, the RGB image signals which are written for displaying images in the second region and the third region in the second frame period F_2 in FIG. 1B are referred to as fifth image signals R5, G5, and B5 and sixth image signals R6, G6, and B6, respectively. Note that in particular, in the case where the image signals and lightings of the light sources in the rows in the first half and the rows in the latter half are divided in each region for description, "f" is added like the first image signals B1$f$ in the row in the first half, and "b" is added like the first image signals B1$b$ in the row in the latter half In addition, also in the second frame period F_2, the first sub-frame period SF_1 to the third sub-frame period SF_3 can be referred to in a manner similar to that of the first frame period F_1.

In the first half of the first region in the first frame period F_1 illustrated in FIG. 1B, the first R image signals R1 con-figured to perform color display in the first sub-frame period SF_1 are written to the rows, and lighting of the light sources of R1 is performed. Next, in the second sub-frame period SF_2, the first G image signals G1 are written, and lighting of the light sources of G1 is performed. Then, in the third sub-frame period SF_3, the first B image signals B1$f$ are written, and lighting of light sources of B1$f$ is performed.

In addition, in the latter half of the first region in the first frame period F_1 illustrated in FIG. 1B, lighting of light sources of B1$b$ for performing color display in the first sub-frame period SF_1 is performed and the first R image signals R1 for performing color display are written to the rows. Next, in the second sub-frame period SF_2, lighting of the light sources of R1 is performed, and the first G image signals G1 are written. Then, in the third sub-frame period SF_3, lighting of the light sources of G1 is performed, and fourth B image signals B4$b$ are written.

In the first half of the second region in the first frame period F_1 illustrated in FIG. 1B, the second B image signals B2 for performing color display in the first sub-frame period SF_1 are written to the rows, and lighting of the light sources of B2 is performed. Next, in the second sub-frame period SF_2, the second R image signals R2 are written, and lighting of the light sources of R2 is performed. Then, in the third sub-frame period SF_3, second G image signals G2$f$ are written, and lighting of light sources of G2$f$ is performed.

In addition, in the latter half of the second region in the first frame period F_1 illustrated in FIG. 1B, lighting of light sources of G2$b$ for performing color display in the first sub-frame period SF_1 is performed and the second B image signals B2 for performing color display are written to the rows. Next, in the second sub-frame period SF_2, lighting of the light sources of B2 is performed, and the second R image signals R2 are written. Then, in the third sub-frame period SF_3, lighting of the light sources of R2 is performed, and fifth G image signals G5$b$ are written.

In the first half of the third region in the first frame period F_1 illustrated in FIG. 1B, the third G image signals G3 for performing color display in the first sub-frame period SF_1 are written to the rows, and lighting of the light sources of G3 is performed. Next, in the second sub-frame period SF_2, the third B image signals B3 are written, and lighting of the light sources of B3 is performed. Then, in the third sub-frame period SF_3, the third R image signals R3$f$ are written, and lighting of the light sources of R3$f$ is performed.

In addition, in the latter half of the third region in the first frame period F_1 illustrated in FIG. 1B, lighting of the light sources of R3$b$ for performing color display in the first sub-frame period SF_1 is performed and the third G image signals G3 for performing color display are written to the rows. Next, in the second sub-frame period SF_2, lighting of the light sources of G3 is performed, and the third B image signals B3 are written. Then, in the third sub-frame period SF_3, lighting of the light sources of B3 is performed, and sixth R image signals R6$b$ are written.

In the above-described first region in the first frame period F_1, color display can be performed by an additive color mixture using the first image signals R1, G1, and B1 and lighting of the light sources corresponding to the image signals in the first sub-frame period SF_1 to the third sub-frame period SF_3. Similarly, in the second region and the third region, color display by an additive color mixture can also be performed. Therefore, one image can be displayed in the first frame period F_1. In the first half of the first region in the second frame period F_2 illustrated in FIG. 1B, the fourth R image signals R4 for performing color display in the first sub-frame period SF_1 are written to the rows, and lighting of the light sources of R4 is performed. Next, in the second sub-frame period SF_2, the fourth G image signals G4 are written, and lighting of the light sources of G4 is performed. Then, in the third sub-frame period SF_3, fourth B image signals B4f are written, and lighting of light sources of B4f is performed.

In addition, in the latter half of the first region in the second frame period F_2 illustrated in FIG. 1B, lighting of light sources of B4b for performing color display in the first sub-frame period SF_1 is performed and the fourth R image signals R4 for performing color display are written to the rows. Next, in the second sub-frame period SF_2, lighting of the light sources of R4 is performed, and the fourth G image signals G4 are written. Then, in the third sub-frame period SF_3, lighting of the light sources of G4 is performed, and seventh B image signals B7b are written.

In the first half of the second region in the second frame period F_2 illustrated in FIG. 1B, the fifth B image signals B5 for performing color display in the first sub-frame period SF_1 are written to the rows, and lighting of light sources of B5 is performed. Next, in the second sub-frame period SF_2, the fifth R image signals R5 are written, and lighting of light sources of R5 is performed. Then, in the third sub-frame period SF_3, fifth G image signals G5f are written, and lighting of light sources of G5f is performed.

In addition, in the latter half of the second region in the second frame period F_2 illustrated in FIG. 1B, lighting of light sources of G5b for performing color display in the first sub-frame period SF_1 is performed and the fifth B image signals B5 for performing color display are written to the rows. Next, in the second sub-frame period SF_2, lighting of the light sources of B5 is performed, and the fifth R image signals R5 are written. Then, in the third sub-frame period SF_3, lighting of the light sources of R5 is performed, and eighth G image signals G8b are written.

In the first half of the third region in the second frame period F_2 illustrated in FIG. 1B, the sixth G image signals G6 for performing color display in the first sub-frame period SF_1 are written to the rows, and lighting of light sources of G6 is performed. Next, in the second sub-frame period SF_2, the sixth B image signals B6 are written, and lighting of the light sources of B6 is performed. Then, in the third sub-frame period SF_3, sixth R image signals R6f are written, and lighting of light sources of R6f is performed.

In addition, in the latter half of the third region in the second frame period F_2 illustrated in FIG. 1B, lighting of light sources of R6b for performing color display in the first sub-frame period SF_1 is performed and the sixth G image signals G6 for performing color display are written to the rows. Next, in the second sub-frame period SF_2, lighting of the light sources of G6 is performed, and the sixth B image signals B6 are written. Then, in the third sub-frame period SF_3, lighting of the light sources of B6 is performed, and ninth R image signals R9b are written.

In the above-described first region in the second frame period F_2, color display can be performed by an additive color mixture using the fourth image signals R4, G4, and B4 and lighting of the light sources corresponding to the image signals in the first sub-frame period SF_1 to the third sub-frame period SF_3. Similarly, in the second region and the third region, color display by an additive color mixture can also be performed. Therefore, one image can be displayed in the second frame period F_2.

As described with reference to FIG. 1B, by the driving method of a display device in this embodiment, the writing period of the image signals to each pixel and the lighting period of the light sources corresponding to the image signals in one frame period can be rearranged so that the lighting period of the light sources corresponding to the image signals does not overlap with a previous frame period and the next frame period. In other words, as for the image signals written in one given frame period in a display region divided into a plurality of regions, in the case where each display region is divided into rows in the first half and rows in the latter half, image signals are written and the light sources corresponding to the image signals are turned on in the frame period in the rows in the first half. On the other hand, in the rows in the latter half of each display region, the light sources corresponding to the image signals which have been written in advance in a frame period just before the frame period are turned on in the first sub-frame period SF_1, and the image signals for lighting of the light sources in a next frame period are written in the third sub-frame period SF_3.

Specifically, in the structure illustrated in FIG. 1B, the second frame period F_2 is described as the one given frame period, and the first to k-th rows in the first region are considered. In this case, the first to t-th rows correspond to the rows in the first half, and the (t+1)-th to k-th rows correspond to the rows in the latter half. The writing of the image signals and the lighting of the light sources corresponding to the image signals are sequentially performed in the second frame period F_2 in the rows in the first half. In the rows in the latter half in the first sub-frame period SF_1, lighting of the light sources of B4b is performed in accordance with the fourth B image signals B4b written in the first frame period F_1 which is a frame period just before the second frame period F_2. In addition, in the third sub-frame period, the seventh B image signals B7b in a third frame period F_3 (not illustrated) which is the next frame period are written to the rows in the latter half. Note that in FIG. 1B, also in the (k+1)-th to 2k-th rows in the second region and the (2k+1)-th to m-th rows in the third region, lighting of the light sources corresponding to the image signals written in a previous frame period and writing of image signals for the next frame period are performed in the rows in the latter half.

By the above driving method of a display device, in each of the consecutive frame periods, the writing period of the image signals to each pixel and the lighting period of the light sources corresponding to the image signals can be rearranged so that the lighting period of the light sources corresponding to the image signals does not overlap with the previous frame period and the next frame period.

Therefore, by the driving method of a display device of this embodiment, a period in which the first frame period F_1 and the second frame period F_2 overlap with each other can be reduced. By reducing the period in which the first frame period F_1 and the second frame period F_2 overlap with each other, crosstalk between consecutive frames can be reduced.

Note that FIG. 1B illustrates only an example of the order of writing of the RGB image signals and lighting of the RGB light sources in the first to third regions in the first frame period F_1 and the second frame period F_2; however, the order of RGB is not particularly limited. In other words, in a structure of this embodiment, a structure in which the light sources are turned on based on the writing of the RGB image signals in one frame period is used.

Figure 2A:
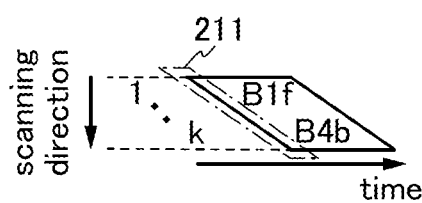
FIGS. 2A and 2B are diagrams to describe Embodiment 1.
Figure 2B:
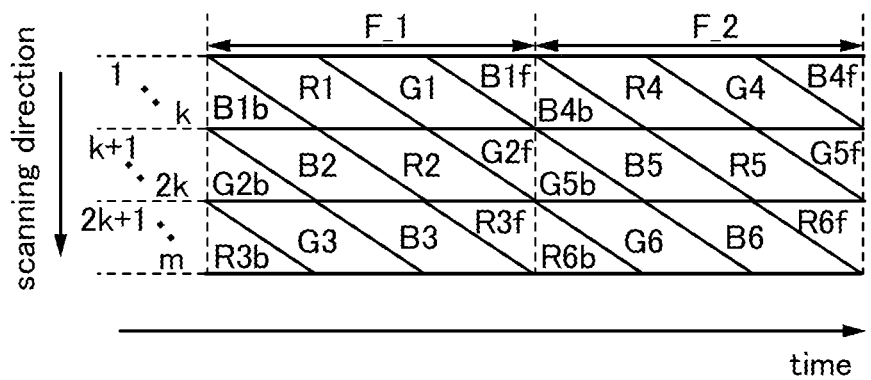

Further, FIGS. 2A and 2B are further schematic views of the driving method of a display device of this embodiment described with reference to FIGS. 1A and 1B.

FIG. 2A is a schematic view of writing of image signals and the sum of a response period of liquid crystals and a lighting period of light sources corresponding to regions to which the image signals are written, which is different from that in FIG.

1A. In FIG. 2A, an oblique side 211 represents the writing of the image signals by scan lines performed sequentially in a scanning direction, "B1f" shown within a framework means that the image signals written to the rows in the first half in each region described in FIG. 1A are image signals "B1". In addition, "B1f" shown within the framework represents the lighting of the light sources performed after the response period of the liquid crystals corresponding to the image signals written to the rows in the first half. Further, "B4b" shown within the framework means that the image signals written to the rows in the latter half in each region described in FIG. 1A are image signals "B4". In addition, "B4b" shown within the framework represents lighting of the light sources performed after the response period of the liquid crystals corresponding to the image signals written to the rows in the latter half.

FIG. 2B illustrates operation in consecutive frames using the writing period of the image signals and the sum of the response period of the liquid crystals and the lighting period of the light sources described in FIG. 2A. Further, FIG. 2B illustrates the driving method which is the same driving as in FIG. 1B.

As in FIG. 1B, in the first frame period F_1 and the second frame period F_2 illustrated in FIG. 2B, color display can be performed by an additive color mixture in the first to third regions without an overlap between the first frame period F_1 and the second frame period F_2.

In the structure of this embodiment as described above, the display device in which color display is performed by sequentially turning on the light sources of different colors by field sequential driving is described; however, a display device including writing of image signals and a display period corresponding to the writing is applicable to another structure. For example, a similar structure can be used for a display device including a color filter and a white light source, which can be realized by applying a structure of this embodiment in which any of RGB image signals of one region is written to a structure in which the image signals are written in one screen.

This embodiment can be implemented in appropriate combination with the structures described in the other embodiments.

(Embodiment 2)

In this embodiment, a driving method of a liquid crystal display device in which a black image is inserted between frames in the structure described in Embodiment 1 will be described.

Figure 3A:
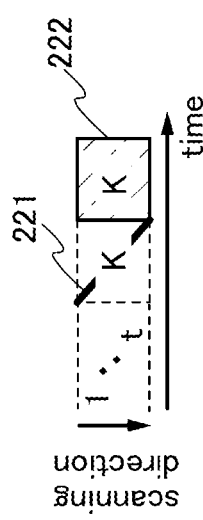
FIGS. 3A and 3B are diagrams to describe Embodiment 2.

FIG. 3A is a schematic view of writing of image signals and the sum of a response period of liquid crystals and a lighting period of light sources corresponding to regions to which the image signals are written. FIG. 3A illustrates a state in which, when selection signals are sequentially supplies to scan lines of first to i-th rows in a direction (scanning direction) where a plurality of scan lines (also referred to as gate lines) is provided, image signals for displaying a black image are written to pixels of signal lines (also referred to as data lines), and a state of a non-lighting period of light sources.

In FIG. 3A, a heavy line 221 represents writing of the image signals for displaying a black image, and a region shown by an oblique hatching 222 represents the sum of a response period of liquid crystals and a non-lighting period of light sources. In addition, "K" which overlaps with the heavy line 221 represents writing of the image signals for displaying a black image to pixels selected by signals of the scan lines of the first to i-th rows. Note that the expression when another image signal is written is the same as that in FIG 1A described in Embodiment 1.

In addition, "K" which overlaps with the oblique hatching 222 represents a non-lighting period of a light source. Note that in the case where the image signals for displaying a black image are written just before the non-lighting of the light sources, a black image can be displayed without the non-lighting of the light sources; therefore, the non-lighting of the light sources is not necessarily performed. Lighting and non-lighting of light sources of given colors may be repeated in accordance with normal operation. Note that the expression when lighting of another light source is performed is the same as that in FIG. 1A described in Embodiment 1. Note that a period in which the image signals are written and a period in which the light sources are turned on or off in FIG. 3A serve as a sub-frame period which forms one frame period.

Figure 3B:
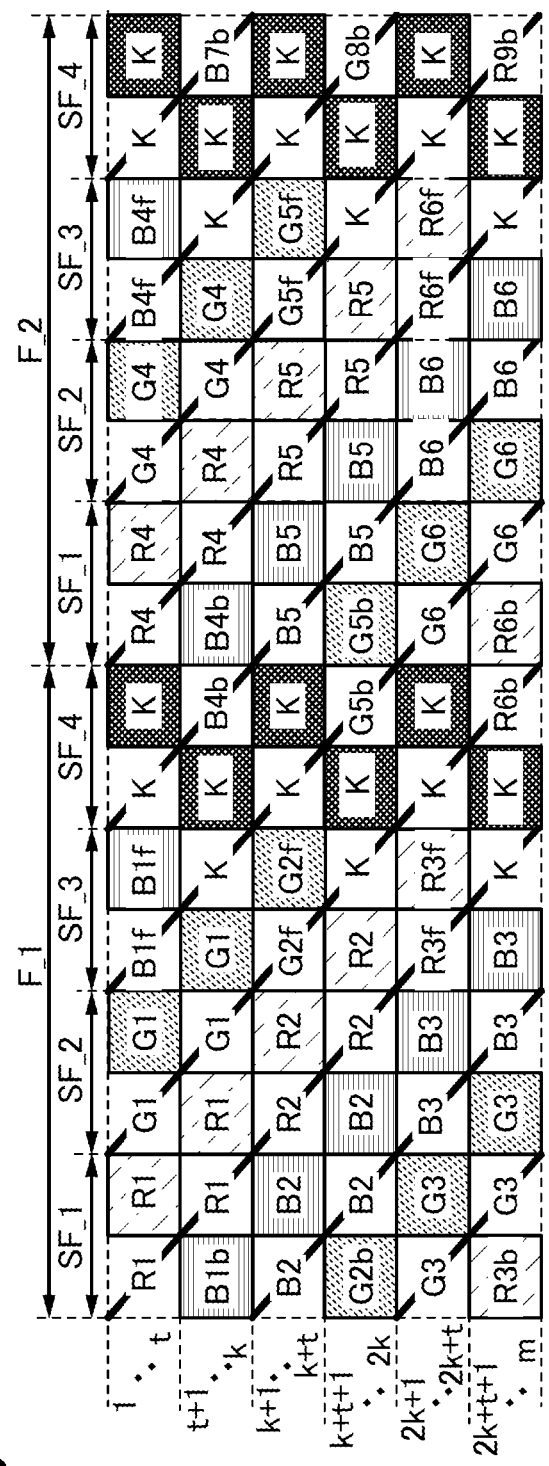

FIG. 3B illustrates the operation of consecutive frames using a state described in FIG. 3A in which the image signals for displaying the black images are written and the light source are turned off, and a driving method of a display device of this embodiment. FIG. 3B illustrates a state in which in scan lines are provided in the first to k-th rows, (k+1)-th to 2k-th rows, and (2k+1)-th to m-th rows (in is a natural number greater than or equal to 3k) in the scanning direction as an example. Note that the description in FIG. 3B repeats that in FIG. 1B; therefore, a point different from that in FIG. 1B is described in this embodiment. Note that periods in which the first image signals R1, G1, B1f, and K are written to rows in the first half of the first region illustrated in FIG. 3B and periods in which the light sources in R1, G1, B1f, and K are turned on serve as the first sub-frame period SF I, the second sub-frame period SF_2, the third sub-frame period SF_3, and a fourth sub-frame period SF_4. In addition, also in the second frame period F_2, the first sub-frame period SF_1 to the fourth sub-frame period SF_4 can be provided in a manner similar to that of the first frame period F_1.

In the first half of the first region in the first frame period F_1 illustrated in FIG. 3B, the first R image signals R1 configured to perform color display in the first region in the first sub-frame period SF_1 are written to the rows, and lighting of the light sources of R1 is performed. Next, in the second sub-frame period SF_2, the first G image signals G1 are written, and lighting of the light sources of G1 is performed. Then, in the third sub-frame period SF_3, the first B image signals B1f are written, and lighting of the light sources of B1f is performed. Next, in the fourth sub-frame period SF_4, the image signals for displaying a black image are written, and the light sources are turned off.

In addition, in the latter half of the first region in the first frame period F_1 illustrated in FIG. 3B, lighting of the light sources of Bib for performing color display in the first region in the first sub-frame period SF_1 is performed and the first R image signals R1 for performing color display in the first region are written to the rows. Next, in the second sub-frame period SF_2, lighting of the light sources of R1 is performed, and the first G image signals G1 are written. Then, in the third sub-frame period SF 3, lighting of the light sources of G1 is performed, and the image signals for displaying a black image are written. Next, in the fourth sub-frame period SF_4, the light sources are turned off, and the fourth B image signals B4b are written.

In the first half of the second region in the first frame period F_1 illustrated in FIG. 3B, the second B image signals B2 for performing color display in the second region in the first sub-frame period SF_1 are written to the rows, and lighting of the light sources of B2 is performed. Next, in the second sub-frame period SF_2, the second R image signals R2 are written, and lighting of the light sources of R2 is performed. Then, in the third sub-frame period SF_3, the second G image signals G2f are written, and lighting of the light sources of G2f is performed. Next, in the fourth sub-frame period SF_4, the image signals for displaying a black image are written, and the light sources are turned off.

In addition, in the latter half of the second region in the first frame period F_1 illustrated in FIG. 3B, lighting of the light sources of G2b for performing color display in the second region in the first sub-frame period SF_1 is performed and the second B image signals B2 for performing color display in the second region are written to the rows. Next, in the second sub-frame period SF_2, lighting of the light sources of B2 is performed, and the second R image signals R2 are written. Then, in the third sub-frame period SF_3, lighting of the light sources of R2 is performed, and the image signals for displaying a black image are written. Next, in the fourth sub-frame period SF_4, the light sources are turned off, and the fifth G image signals G5b are written.

In the first half of the third region in the first frame period F_1 illustrated in FIG. 3B, the third G image signals G3 for performing color display in the third region in the first sub-frame period SF_1 are written to the rows, and lighting of the light sources of G3 is performed. Next, in the second sub-frame period SF_2, the third B image signals B3 are written, and lighting of the light sources of B3 is performed. Then, in the third sub-frame period SF_3, third R image signals R3f are written, and lighting of light sources of R3f is performed. Next, in the fourth sub-frame period SF_4, the image signals for displaying a black image are written, and the light sources are turned off.

In addition, in the latter half of the third region in the first frame period F_1 illustrated in FIG. 3B, lighting of light sources of R3b for performing color display in the third region in the first sub-frame period SF_1 is performed and the third G image signals G3 for performing color display in the third region are written to the rows. Next, in the second sub-frame period SF_2, lighting of the light sources of G3 is performed, and the third B image signals B3 are written. Then, in the third sub-frame period SF_3, lighting of the light sources of B3 is performed, and the image signals for displaying a black image are written. Next, in the fourth sub-frame period SF_4, the light sources are turned off, and the sixth R image signals R6b are written.

In the above-described first region in the first frame period F_1, color display can be performed by an additive color mixture using the first image signals R1, G1, and B1 and lighting of the light sources corresponding to the image signals in the first sub-frame period SF_1 to the fourth sub-frame period SF_4. Similarly, in the second region and the third region, color display by an additive color mixture can also be performed. Therefore, one image can be displayed in the first frame period F_1. In addition, a black display period is provided between the first frame period F_1 and the second frame period F_2 which is the next frame period, so that there is an effect such that crosstalk between the consecutive frames can be more surely reduced.

In the first half of the first region in the second frame period F_2 illustrated in FIG. 3B, the fourth R image signals R4 for performing color display in the first region in the first sub-frame period SF_1 are written to the rows, and lighting of the light sources of R4 is performed. Next, in the second sub-frame period SF_2, the fourth G image signals G4 are written, and lighting of the light sources of G4 is performed. Then, in the third sub-frame period SF_3, the fourth B image signals B4f are written, and lighting of the light sources of B4f is performed. Next, in the fourth sub-frame period SF_4, the image signals for displaying a black image are written, and the light sources are turned off.

In addition, in the latter half of the first region in the second frame period F_2 illustrated in FIG. 3B, lighting of the light sources of B4b for performing color display in the first region in the first sub-frame period SF_i is performed and the fourth R image signals R4 for performing color display in the first region are written to the rows. Next, in the second sub-frame period SF_2, lighting of the light sources of R4 is performed, and the fourth G image signals G4 are written. Then, in the third sub-frame period SF_3, lighting of the light sources of G4 is performed, and the image signals for displaying a black image are written. Next, in the fourth sub-frame period SF_4, the light sources are turned off, and the seventh B image signals B7b are written.

In the first half of the second region in the second frame period F_2 illustrated in FIG. 3B, the fifth B image signals B5 for performing color display in the second region in the first sub-frame period SF_1 are written to the rows, and lighting of the light sources of B5 is performed. Next, in the second sub-frame period SF_2, the fifth R image signals R5 are written, and lighting of the light sources of R5 is performed. Then, in the third sub-frame period SF_3, the fifth G image signals G5f are written, and lighting of the light sources of G5f is performed. Next, in the fourth sub-frame period SF_4, the image signals for displaying a black image are written, and the light sources are turned off.

In addition, in the latter half of the second region in the second frame period F_2 illustrated in FIG. 3B, lighting of the light sources of G5b for performing color display in the second region in the first sub-frame period SF_1 is performed and the fifth B image signals B5 for performing color display in the second region are written to the rows. Next, in the second sub-frame period SF_2, lighting of the light sources of B5 is performed, and the fifth R image signals R5 are written. Then, in the third sub-frame period SF_3, lighting of the light sources of R5 is performed, and the image signals for displaying a black image are written. Next, in the fourth sub-frame period SF_4, the light sources are turned off, and the eighth G image signals G8b are written.

In the first half of the third region in the second frame period F_2 illustrated in FIG. 3B, the sixth G image signals G6 for performing color display in the third region in the first sub-frame period SF_1 are written to the rows, and lighting of the light sources of G6 is performed. Next, in the second sub-frame period SF_2, the sixth B image signals B6 are written, and lighting of the light sources of B6 is performed. Then, in the third sub-frame period SF_3, the sixth R image signals R6f are written, and lighting of the light sources of R6f is performed. Next, in the fourth sub-frame period SF_4, the image signals for displaying a black image are written, and the light sources are turned off.

In addition, in the latter half of the third region in the second frame period F_2 illustrated in FIG. 3B, lighting of the light sources of R6b for performing color display in the third region in the first sub-frame period SF_1 is performed and the sixth G image signals G6 for performing color display in the third region are written to the rows. Next, in the second sub-frame period SF 2, lighting of the light sources of G6 is performed, and the sixth B image signals B6 are written. Then, in the third sub-frame period SF 3, lighting of the light sources of B6 is performed, and the image signals for displaying a black image are written. Next, in the fourth sub-frame period SF_4, the light sources are turned off, and the ninth R image signals R9b are written.

In the above-described first region in the second frame period F_2, color display can be performed by an additive color mixture using the fourth image signals R4, G4, and B4 and lighting of the light sources corresponding to the image signals in the first sub-frame period SF_1 to the fourth sub-frame period SF_4. Similarly, in the second region and the third region, color display by an additive color mixture can also be performed. Therefore, one image can be displayed in the second frame period F_2. In addition, black display periods are provided between the first frame period F_1 which is the previous period and the second frame period F_2 and between the second frame period F_2 and the third frame period F_3 which is the next frame period (not illustrated), so that there is an effect such that crosstalk between the consecutive frames can be more surely reduced.

As described in FIG. 3B, by the driving method of a display device in this embodiment, the writing period of the image signals to each pixel and the lighting period of the light sources corresponding to the image signals in one frame period can be rearranged so that the lighting period of the light sources corresponding to the image signals does not overlap with a previous frame period and the next frame period. In other words, as for the image signals written in one given frame period in the display region divided into a plurality of regions, in the case where each display region is divided into rows in the first half and rows in the latter half, image signals are written and the light sources corresponding to the image signals are turned on in the frame period in the rows in the first half. On the other hand, in the rows in the latter half of each display region, the light sources corresponding to the image signals which have been written in advance in a frame period just before the first sub-frame period SF_1 are turned on, the image signals for displaying a black image are written in the third sub-frame period SF_3, and the image signals for lighting of the light sources in a next frame period are written in the fourth sub-frame period SF_4.

In the structure of this embodiment, in addition to the effect of the structure in Embodiment 1, a black display period is provided before and after the frame periods, so that crosstalk between the consecutive frames can be more surely reduced.

By the above driving method of a display device, in each of the consecutive frame periods, the writing period of the image signals to each pixel and the lighting period of the light sources corresponding to the image signals can be rearranged so that the lighting period of the light sources corresponding to the image signals does not overlap with the previous frame period and the next frame period. In addition, a black display period is provided before and after the frame periods, so that crosstalk between the consecutive frames can be more surely reduced.

Therefore, by the driving method of a display device of this embodiment, a period in which the first frame period F_1 and the second frame period F_2 overlap with each other can be reduced. By reducing the period in which the first frame period F_1 and the second frame period F_2 overlap with each other, crosstalk between consecutive frames can be reduced.

Figure 4A:
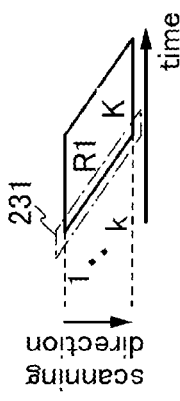
FIGS. 4A and 4B are diagrams to describe Embodiment 2.
Figure 4B:
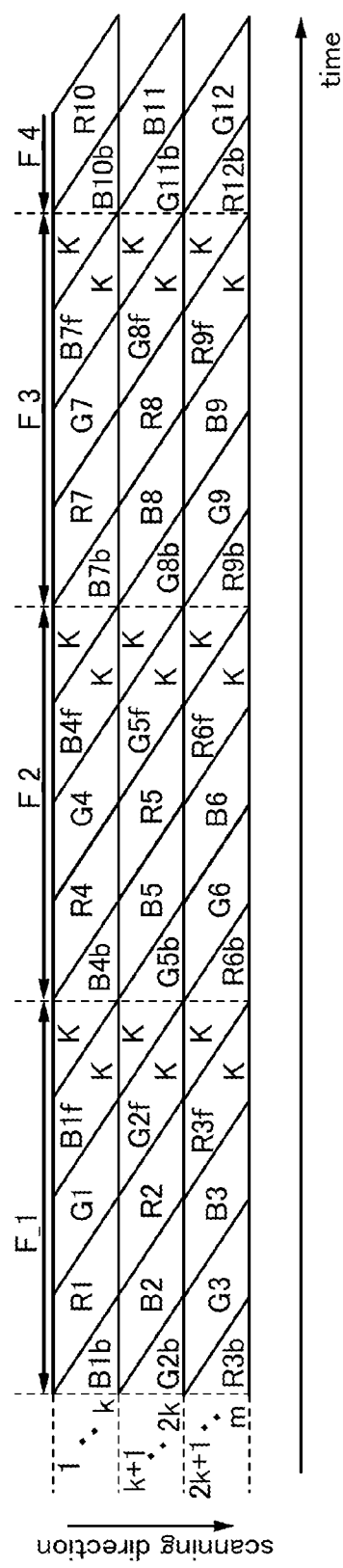

Further, FIGS. 4A and 4B are schematic views of the driving method of a display device of this embodiment described with reference to FIGS. 3A and 3B.

FIG. 4A is a schematic view of writing of image signals and the sum of a response period of liquid crystals and a lighting period of light sources corresponding to regions to which the image signals are written, which is different from that in FIG. 3A. In FIG. 4A, an oblique side 231 represents writing of image signals by scan lines performed sequentially in a scanning direction. In addition, "R1" and "K" shown within a framework mean that image signals written to rows in a first half in each region are red image signals, and image signals written to rows in a latter half are image signals for displaying a black image. Further, "R1" shown within the framework means that the red light sources are turned on in accordance with the image signals written to the rows in the first half. In addition, "K" shown within the framework means that the light sources corresponding to the rows in the latter half in each region are turned off.

FIG. 4B illustrates the operation of consecutive frames using a state described in FIG. 4A in which the image signals are written and the light sources are turned on. FIG. 4B illustrates the driving method of a display device of this embodiment, and illustrates the same driving as in FIG. 3B.

As in FIG. 3B, in the first frame period F_1 and the second frame period F_2 illustrated in FIG. 4B, color display can be performed by an additive color mixture in the first to third regions without an overlap between the first frame period F_1 and the second frame period F_2. In addition, a black display period is provided before and after the frame periods, so that crosstalk between the consecutive frames can be more surely reduced.

This embodiment can be implemented in appropriate combination with the structures described in the other embodiments.

(Embodiment 3)

In this embodiment, a structure for seeing a stereoscopic image using any of the driving methods of a display device described in Embodiment 1 and Embodiment 2 will be described.

Figure 5:
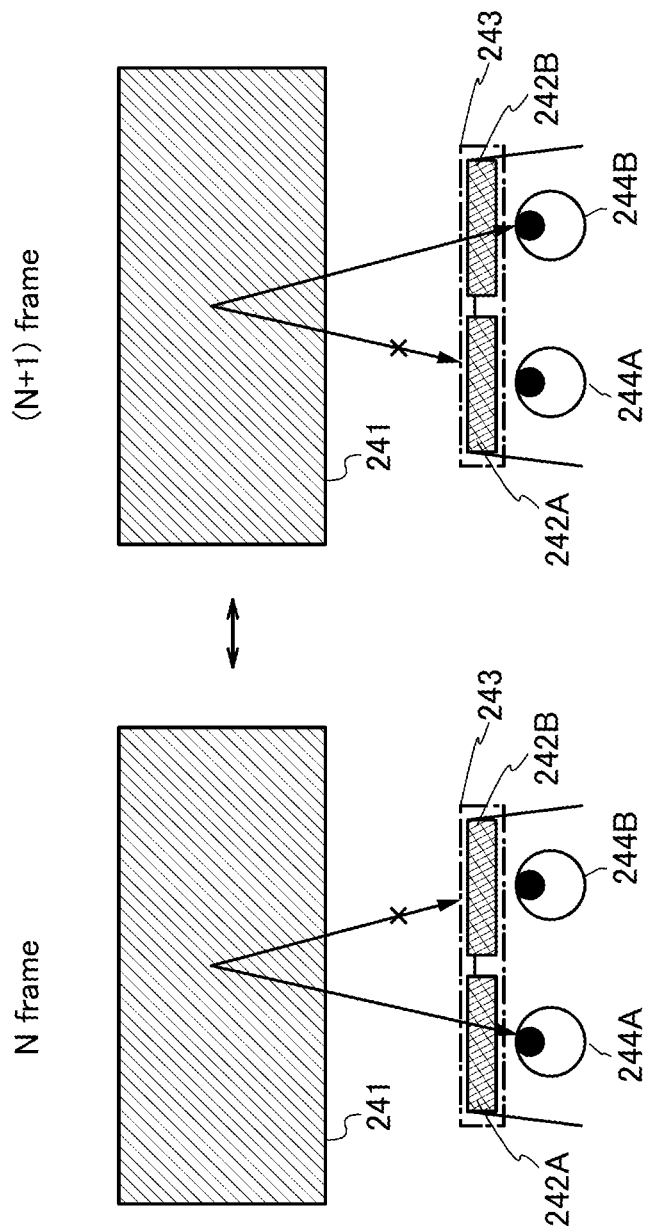
FIG. 5 is a diagram to describe Embodiment 3.

As illustrated in FIG. 5, an image for a left eye and an image for a right eye included in a display portion 241 of a display device in which any of the driving methods of a display device described in Embodiment 1 and Embodiment 2 is performed is seen using glasses 243 including a left eye shutter 242A and a right eye shutter 242B, so that different images can be seen with a left eye 244A and a right eye 244B.

In other words, as illustrated in FIG. 5, in an N frame (N is a natural number), light from the display portion, which enters the left eye 244A, is transmitted through the left eye shutter 242A and no light from the display portion, which enters the right eye 244B is transmitted through the right eye shutter 242B. In addition, in a (N+1) frame, no light from the display portion, which enters the left eye 244A, is transmitted through the left eye shutter 242A, and light from the display portion, which enters the right eye 244B, is transmitted through the right eye shutter 242B. A three-dimensional image is recognized by binocular disparity by a frame sequential method.

In addition, in a display device in which the driving method of a display device described in Embodiment 1 is performed, transmission and non-transmission of each of the left eye shutter and the right eye shutter are switched and an image is seen as illustrated in FIG. 6A. In FIG. 6A, the first frame period F_1 in FIG. 2B serves as a first sub-frame period F_1L for a left eye, the second frame period F_2 in FIG. 2B serves as a first sub-frame period F_1R for a right eye, and the third frame period F_3 (not illustrated) serves as a second sub-frame period F_2L for a left eye.

In a similar manner, in a display device in which the driving method of a display device described in Embodiment 2 is performed, transmission and non-transmission of each of the left eye shutter and the right eye shutter are switched as illustrated in FIG. 6B. In FIG. 6B, the first frame period F_1 in FIG. 4B serves as the first sub-frame period F_1L for a left eye, the second frame period F_2 in FIG. 4B serves as the first sub-frame period F_1R for a right eye, and the third frame period F_3 serves as the second sub-frame period F_2L for a left eye.

With a structure of this embodiment as described above, in the sub-frame periods in which the right and left images are switched and a stereoscopic image is displayed, crosstalk between the sub-frame periods in which the left image and the right image are displayed can be reduced.

This embodiment can be implemented in appropriate combination with the structures described in the other embodiments.

(Embodiment 4)

In this embodiment, as an example of a display device described in Embodiments 1 to 3, a liquid crystal display device including a liquid crystal element as a display element will be described with reference to FIGS. 7A and 7B, FIGS. 8A to 8C, FIGS. 9A to 9D, FIGS. 10A and 10B, FIG. 11, and FIG. 12. Note that the display element may be an element which controls light transmission or no light transmission, and a micro electro mechanical system (MEMS) element, for example, may be used in addition to the liquid crystal element.

<Structure Example of Liquid Crystal Display Device>

Figure 7A:
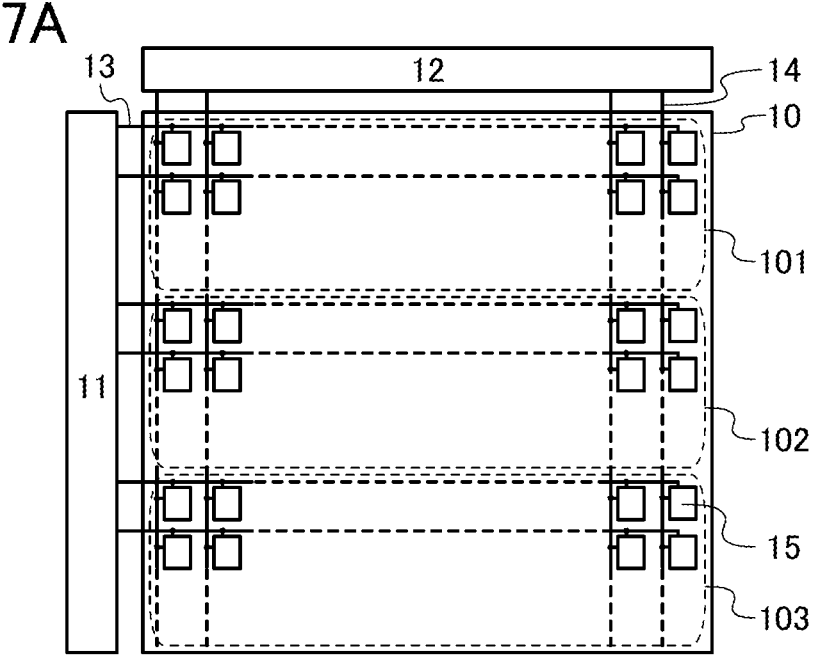
FIGS. 7A and 7B are diagrams to describe Embodiment 4.

FIG. 7A illustrates a structure example of a liquid crystal display device. The liquid crystal display device illustrated in FIG. 7A includes a pixel portion 10, a scan line driver circuit 11, a signal line driver circuit 12, m scan lines 13, and n signal lines 14. The pixel portion 10 is divided into three regions (regions 101 to 103), and each region includes a plurality of pixels arranged in a matrix. Each of the scan lines 13 is connected to the n pixels in the corresponding row, among the plurality of pixels arranged in m rows and n columns in the pixel portion 10. Each of the signal lines 14 is connected to the m pixels in the corresponding column, among the plurality of pixels arranged in the m rows and the n columns.

Figure 7B:
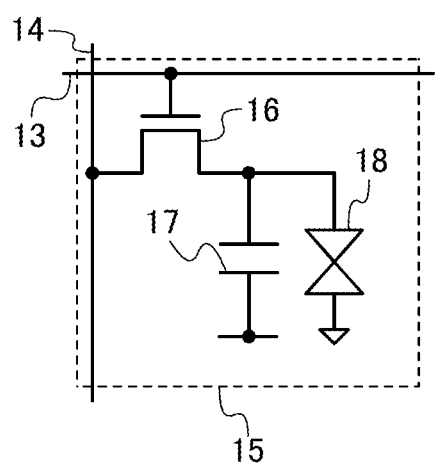

FIG. 7B illustrates an example of a circuit configuration of a pixel 15 included in the liquid crystal display device illustrated in FIG. 7A. The pixel 15 in FIG. 7B includes a transistor 16, a capacitor 17, and a liquid crystal element 18. A gate of the transistor 16 is connected to the scan line 13, and one of a source and a drain of the transistor 16 is connected to the signal line 14. One of electrodes of the capacitor 17 is connected to the other of the source and the drain of the transistor 16, and the other of the electrodes of the capacitor 17 is connected to a wiring for supplying a capacitor potential (the wiring is also referred to as a capacitor wiring). One of electrodes (also referred to as a pixel electrode) of the liquid crystal element 18 is connected to the other of the source and the drain of the transistor 16 and one of the electrodes of the capacitor 17, and the other of the electrodes (also referred to as a counter electrode) of the liquid crystal element 18 is connected to a wiring for supplying a counter potential. The transistor 16 is an n-channel transistor. The capacitor potential and the counter potential can be the same potential.

<Structure Example of Scan Line Driver Circuit 11>

Figure 8A:
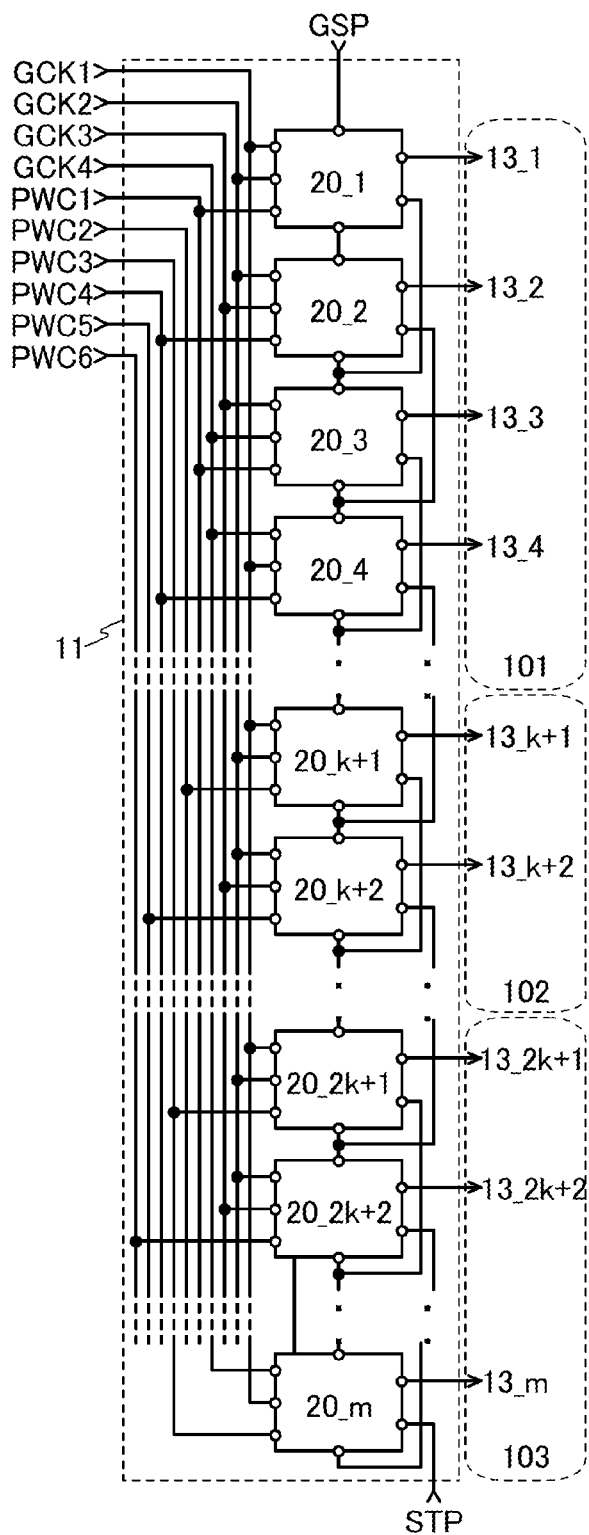
FIGS. 8A to 8C are diagrams to describe Embodiment 4.

FIG. 8A illustrates a structure example of the scan line driver circuit 11 included in the liquid crystal display device in FIG. 7A. The scan line driver circuit 11 illustrated in FIG. 8A includes: respective wirings for supplying first to fourth clock signals (GCK1 to GCK4) for the scan line driver circuit; respective wirings for supplying first to sixth pulse-width control signals (PWC1 to PWC6); and a first pulse output circuit 20_1 which is connected to the scan line 13_1 in the first row to an m-th pulse output circuit 20_m which is connected to the scan line 13_m in the m-th row. Note that here, the first pulse output circuit 20_1 to the k-th pulse output circuit 20_k (k is less than m/2 and a multiple of 4) are connected to the respective scan lines 13_1 to 13_k provided for the region 101; the (k+1)-th pulse output circuit 20_(k+1) to the 2k-th pulse output circuit 20_2k are connected to the respective scan lines 13_(k+1) to 13_2k provided for the region 102; and the (2k+1)-th pulse output circuit 20_(2k+1) to the m-th pulse output circuit 20_m are connected to the respective scan lines 13_(2k+1) to 13_m provided for the region 103. The first pulse output circuit 20_1 to the m-th pulse output circuit 20_m are configured to shift a shift pulse sequentially per shift period in response to a start pulse (GSP) for the scan line driver circuit which is input to the first pulse output circuit 20_1. Note that a plurality of shift pulses can be shifted in parallel in the first pulse output circuit 20_1 to the m-th pulse output circuit 20_m. In other words, even in a period in which a shift pulse is shifted in the first pulse output circuit 20_1 to the m-th pulse output circuit 20_m, the start pulse (GSP) for the scan line driver circuit can be input to the first pulse output circuit 20_1.

Figure 8B:
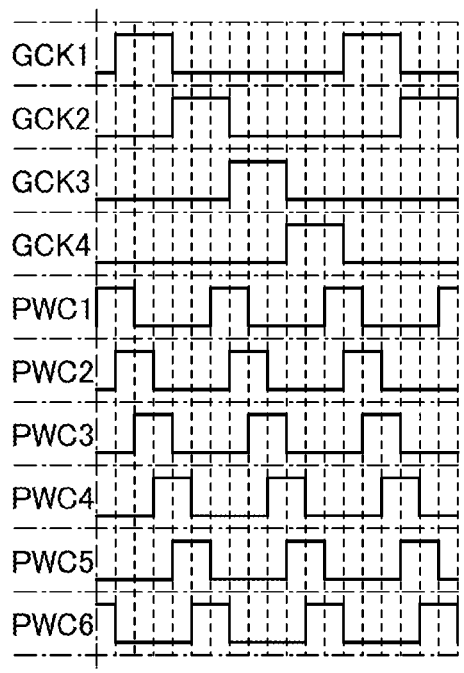

FIG. 8B illustrates examples of specific waveforms of the above-described signals. The first clock signal (GCK1) for the scan line driver circuit in FIG. 8B periodically repeats a high-level potential (high power supply potential (Vdd)) and a low-level potential (low power supply potential (Vss)), and has a duty ratio of ¼. The second clock signal (GCK2) for the scan line driver circuit is a signal whose phase is deviated by ¼ period from the first clock signal (GCK1) for the scan line driver circuit; the third clock signal (GCK3) for the scan line driver circuit is a signal whose phase is deviated by ½ period from the first clock signal (GCK1) for the scan line driver circuit; and the fourth clock signal (GCK4) for the scan line driver circuit is a signal whose phase is deviated by ¾ period from the first clock signal (GCK1) for the scan line driver circuit. The first pulse-width control signal (PWC1) periodically repeats the high-level potential (high power supply potential (Vdd)) and the low-level potential (low power supply potential (Vss)), and has a duty ratio of ⅓. The second pulse-width control signal (PWC2) is a signal whose phase is deviated by ⅙ period from the first pulse-width control signal (PWC1); the third pulse-width control signal (PWC3) is a signal whose phase is deviated by ⅓ period from the first pulse-width control signal (PWC1); the fourth pulse-width control signal (PWC4) is a signal whose phase is deviated by ½ period from the first pulse-width control signal (PWC1); the fifth pulse-width control signal (PWC5) is a signal whose phase is deviated by ⅔ period from the first pulse-width control signal (PWC1); and the sixth pulse-width control signal (PWC6) is a signal whose phase is deviated by ⅚ period from the first pulse-width control signal (PWC1). Note that here, the ratio of the pulse width of each of the first to fourth clock signals (GCK1 to GCK4) for the scan line driver circuit, to the pulse width of each of the first to sixth pulse-width control signals (PWC1 to PWC6) is 3:2.

In the above-described liquid crystal display device, the same configuration can be applied to the first pulse output circuit 20_1 to the m-th pulse output circuit 20_m. However, electrical connections of a plurality of terminals included in the pulse output circuit differ depending on the pulse output circuits. Specific connection relation will be described with reference to FIGS. 8A and 8C.

Each of the first pulse output circuit 20_1 to the m-th pulse output circuit 20_m has terminals 21 to 27. The terminals 21 to 24 and the terminal 26 are input terminals; the terminals 25 and 27 are output terminals.

First, the terminal 21 will be described. The terminal 21 of the first pulse output circuit 20_1 is connected to a wiring for supplying the start pulse signal (GSP) for the scan line driver circuit. The terminals 21 of the second pulse output circuit 20_2 to the m-th pulse output circuit 20_m are connected to respective terminals 27 of their respective previous-stage pulse output circuits.

Next, the terminal 22 will be described. The terminal 22 of the (4a−3)-th pulse output circuit (a is a natural number less than or equal to m/4) is connected to the wiring for supplying the first clock signal (GCK1) for the scan line driver circuit. The terminal 22 of the (4a−2)-th pulse output circuit is connected to the wiring for supplying the second clock signal (GCK2) for the scan line driver circuit. The terminal 22 of the (4a−1)-th pulse output circuit is connected to the wiring for supplying the third clock signal (GCK3) for the scan line driver circuit. The terminal 22 of the 4a-th pulse output circuit is connected to the wiring for supplying the fourth clock signal (GCK4) for the scan line driver circuit.

Then, the terminal 23 will be described. The terminal 23 of the (4a−3)-th pulse output circuit is connected to the wiring for supplying the second clock signal (GCK2) for the scan line driver circuit. The terminal 23 of the (4a−2)-th pulse output circuit is connected to the wiring for supplying the third clock signal (GCK3) for the scan line driver circuit. The terminal 23 of the (4a−1)-th pulse output circuit is connected to the wiring for supplying the fourth clock signal (GCK4) for the scan line driver circuit. The terminal 23 of the 4a-th pulse output circuit is connected to the wiring for supplying the first clock signal (GCK1) for the scan line driver circuit.

Next, the terminal 24 will be described. The terminal 24 of the (2b−1)-th pulse output circuit (b is a natural number less than or equal to k/2) is connected to the wiring for supplying the first pulse-width control signal (PWC1). The terminal 24 of the 2b-th pulse output circuit is connected to the wiring for supplying the fourth pulse-width control signal (PWC4). The terminal 24 of the (2c−1)-th pulse output circuit (c is a natural number greater than or equal to (k/2+1) and less than or equal to k) is connected to the wiring for supplying the second pulse-width control signal (PWC2). The terminal 24 of the 2c-th pulse output circuit is connected to the wiring for supplying the fifth pulse-width control signal (PWC5). The terminal 24 of the (2d−1)-th pulse output circuit (d is a natural number greater than or equal to (k+1) and less than or equal to m/2) is connected to the wiring for supplying the third pulse-width control signal (PWC3). The terminal 24 of the 2d-th pulse output circuit is connected to the wiring for supplying the sixth pulse-width control signal (PWC6).

Then, the terminal 25 will be described. The terminal 25 of the x-th pulse output circuit (x is a natural number less than or equal to in) is connected to the scan line 13_x in the x-th row.

Next, the terminal 26 will be described. The terminal 26 of the y-th pulse output circuit (y is a natural number less than or equal to m−1) is connected to the terminal 27 of the (y+1)-th pulse output circuit. The terminal 26 of the m-th pulse output circuit is connected to a wiring for supplying a stop signal (STP) for the m-th pulse output circuit. In the case where a (m+1)-th pulse output circuit is provided, the stop signal (STP) for the m-th pulse output circuit corresponds to a signal output from the terminal 27 of the (m+1)-th pulse output circuit. Specifically, the stop signal (STP) for the m-th pulse output circuit can be supplied to the m-th pulse output circuit by the (m+1)-th pulse output circuit provided as a dummy circuit or by inputting the signal directly from the outside.

Connection relation of the terminal 27 of each pulse output circuit is described above. Therefore, the above description is to be referred to.

<Structure Example of Pulse Output Circuit>

Figure 8C:
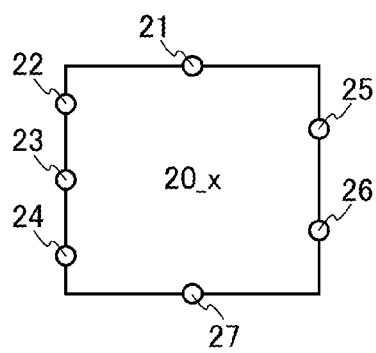

FIG. 9A illustrates a structure example of the pulse output circuit illustrated in FIGS. 8A and 8C. A pulse output circuit illustrated in FIG. 9A includes transistors 31 to 39.

One of a source and a drain of the transistor 31 is connected to a wiring for supplying the high power supply potential (Vdd) (hereinafter also referred to as a high power supply potential line). A gate of the transistor 31 is connected to the terminal 21.

One of a source and a drain of the transistor 32 is connected to a wiring for supplying the low power supply potential (Vss) (hereinafter also referred to as a low power supply potential line). The other of the source and the drain of the transistor 32 is connected to the other of the source and the drain of the transistor 31.

One of a source and a drain of the transistor 33 is connected to the terminal 22. The other of the source and the drain of the transistor 33 is connected to the terminal 27. A gate of the transistor 33 is connected to the other of the source and the drain of the transistor 31 and the other of the source and the drain of the transistor 32.

One of a source and a drain of the transistor 34 is connected to the low power supply potential line. The other of the source and the drain of the transistor 34 is connected to the terminal 27. A gate of the transistor 34 is connected to a gate of the transistor 32.

One of a source and a drain of the transistor 35 is connected to the low power supply potential line. The other of the source and the drain of the transistor 35 is connected to the gate of the transistor 32 and the gate of the transistor 34. A gate of the transistor 35 is connected to the terminal 21.

One of a source and a drain of the transistor 36 is connected to the high power supply potential line. The other of the source and the drain of the transistor 36 is connected to the gate of the transistor 32, the gate of the transistor 34, and the other of the source and the drain of the transistor 35. A gate of the transistor 36 is connected to the terminal 26. Note that it is possible to employ a structure in which one of the source and the drain of the transistor 36 is connected to a wiring for supplying a power supply potential (Vcc) which is higher than the low power supply potential (Vss) and lower than the high power supply potential (Vdd).

One of a source and a drain of the transistor 37 is connected to the high power supply potential line. The other of the source and the drain of the transistor 37 is connected to the gate of the transistor 32, the gate of the transistor 34, the other of the source and the drain of the transistor 35, and the other of the source and the drain of the transistor 36. A gate of the transistor 37 is connected to the terminal 23. Note that it is possible to employ a structure in which one of the source and the drain of the transistor 37 is connected to a wiring for supplying the power supply potential (Vcc).

One of a source and a drain of the transistor 38 is connected to the terminal 24. The other of the source and the drain of the transistor 38 is connected to the terminal 25. A gate of the transistor 38 is connected to the other of the source and the drain of the transistor 31, the other of the source and the drain of the transistor 32, and the gate of the transistor 33.

One of a source and a drain of the transistor 39 is connected to the low power supply potential line. The other of the source and the drain of the transistor 39 is connected to the terminal 25. A gate of the transistor 39 is connected to the gate of the transistor 32, the gate of the transistor 34, the other of the source and the drain of the transistor 35, the other of the source and the drain of the transistor 36, and the other of the source and the drain of the transistor 37.

In the following description, a node where the other of the source and the drain of the transistor 31, the other of the source and the drain of the transistor 32, the gate of the transistor 33, and the gate of the transistor 38 are connected to each other is referred to as a node A; a node where the gate of the transistor 32, the gate of the transistor 34, the other of the source and the drain of the transistor 35, the other of the source and the drain of the transistor 36, the other of the source and the drain of the transistor 37, and the gate of the transistor 39 are connected to each other is referred to as a node B.

<Operation Example of Pulse Output Circuit>

An operation example of the above-described pulse output circuit will be described with reference to FIGS. 9B to 9D. Described here is an operation example in the case where timing of inputting the start pulse (GSP) for the scan line driver circuit to the terminal 21 of the first pulse output circuit 20_1 is controlled such that shift pulses are output from the terminals 27 of the first pulse output circuit 20_1, the (k+1)-th pulse output circuit 20_(k+1), and the (2k+1)-th pulse output circuit 20_(2k+1) at the same timing. Specifically, the potentials of the signals which are input to the terminals of the first pulse output circuit 20_1 and the potentials of the node A and the node B when the start pulse (GSP) for the scan line driver circuit is input are illustrated in FIG. 9B; the potentials of the signals which are input to the terminals of the (k+1)-th pulse output circuit 20_(k+1) and the potentials of the node A and the node B when the high-level potential is input from the k-th pulse output circuit 20_k are illustrated in FIG. 9C; and the potentials of the signals which are input to the terminals of the (2k+1)-th pulse output circuit 20_(2k+1) and the potentials of the node A and the node B when the high-level potential is input from the 2k-th pulse output circuit 20_2k are illustrated in FIG. 9D. In FIGS. 9B to 9D, the signals which are input to the terminals are each provided in parentheses. In addition, the signal (Gout 2, Gout k+2, Gout 2k+2) which is output from the terminal 25 of the subsequent-stage pulse output circuit (the second pulse output circuit 20_2, the (k+2)-th pulse output circuit 20_(k+2), the (2k+2)-th pulse output circuit 20_(2k+2)), and the signal (SRout 2: input signal of the terminal 26 of the first pulse output circuit 20_1, SRout k+2: input signal of the terminal 26 of the (k+1)-th pulse output circuit 20_(k+1), SRout 2k+2: input signal of the terminal 26 of the (2k+1)-th pulse output circuit 20_(2k+1)) output from the terminal 27 of the subsequent-stage pulse output circuit are also illustrated. Note that in FIGS. 9B to 9D, Gout represents an output signal from the pulse output circuit to the scan line, and SRout represents an output signal from the pulse output circuit to the pulse output circuit in the subsequent stage.

First, the case where the high-level potential is input as the start pulse (GSP) for the scan line driver circuit to the first pulse output circuit 20_1 will be described with reference to FIG. 9B.

In a period t1, the high-level potential (high power supply potential (Vdd)) is input to the terminal 21. Thus, the transistors 31 and 35 are on. As a result, the potential of the node A is increased to the high-level potential (potential that is decreased from the high power supply potential (Vdd) by the threshold voltage of the transistor 31), and the potential of the node B is decreased to the low power supply potential (Vss), so that the transistors 33 and 38 are on and the transistors 32, 34, and 39 are off. Thus, in the period t1, a signal output from the terminal 27 is a signal input to the terminal 22, and a signal output from the terminal 25 is a signal input to the terminal 24. Here in the period t1, both the signal input to the terminal 22 and the signal input to the terminal 24 are at the low-level potential (low power supply potential (Vss)). Accordingly, in the period t1, the first pulse output circuit 20_1 outputs the low-level potential (low power supply potential (Vss)) to the terminal 21 of the second pulse output circuit 20_2 and the scan line in the first row in the pixel portion.

In a period t2, the levels of the signals input to the terminals are the same as in the period ti. Therefore, the potentials of the signals output from the terminals 25 and 27 are also not changed; the low-level potentials (low power supply potentials (Vss)) are output.

In a period t3, the high-level potential (high power supply potential (Vdd)) is input to the terminal 24. Note that the potential of the node A (the source potential of the transistor 31) has been increased to the high-level potential (potential that is decreased from the high power supply potential (Vdd) by the threshold voltage of the transistor 31) in the period U. Therefore, the transistor 31 is off. At this time, the input of the high-level potential (high power supply potential (Vdd)) to the terminal 24 further increases the potential of the node A (the potential of the gate of the transistor 38) by capacitive coupling between the source and the gate of the transistor 38 (bootstrapping). Owing to the bootstrapping, the potential of the signal output from the terminal 25 is not decreased from the high-level potential (high power supply potential (Vdd)) input to the terminal 24. Accordingly, in the period t3, the first pulse output circuit 20_1 outputs the high-level potential (high power supply potential (Vdd)=a selection signal) to the scan line in the first row in the pixel portion.

In a period t4, the high-level potential (high power supply potential (Vdd)) is input to the terminal 22. As a result, since the potential of the node A has been increased by the bootstrapping, the potential of the signal output from the terminal 27 is not decreased from the high-level potential (high power supply potential (Vdd)) input to the terminal 22. Accordingly, in the period t4, the terminal 27 outputs the high-level potential (high power supply potential (Vdd)) which is input to the terminal 22. In other words, the first pulse output circuit 20_1 outputs the high-level potential (high power supply potential (Vdd)=a shift pulse) to the terminal 21 of the second pulse output circuit 20_2. In the period t4 also, the signal input to the terminal 24 maintains the high-level potential (high power supply potential (Vdd)), so that the signal output to the scan line in the first row in the pixel portion from the first pulse output circuit 20_1 remains at the high-level potential (high power supply potential (Vdd)=the selection signal). Further, the low-level potential (low power supply potential (Vss)) is input to the terminal 21 to turn off the transistor 35, which does not directly influence the output signal of the pulse output circuit in the period t4.

In a period t5, the low-level potential (low power supply potential (Vss)) is input to the terminal 24. In that period, the transistor 38 maintains the on state. Accordingly, in the period t5, the first pulse output circuit 20_1 outputs the low-level potential (low power supply potential (Vss)) to the scan line arranged in the first row in the pixel portion.

In a period t6, the levels of the signals input to the terminals are the same as in the period t5. Therefore, the potentials of the signals output from the terminals 25 and 27 are also not changed; the low-level potential (low power supply potentials (Vss)) is output from the terminal 25 and the high-level potential (high power supply potential (Vdd)=the shift pulse) is output from the terminal 27.

In a period t7, the high-level potential (high power supply potential (Vdd)) is input to the terminal 23. Thus, the transistor 37 is on. As a result, the potential of the node B is increased to the high-level potential (potential that is decreased from the high power supply potential (Vdd) by the threshold voltage of the transistor 37). In other words, the transistors 32, 34, and 39 are on. On the other hand, the potential of the node A is decreased to the low-level potential (low power supply potential (Vss)). In other words, the transistors 33 and 38 are off. Accordingly, in the period t7, both of the signals output from the terminals 25 and 27 are at the low power supply potentials (Vss). In other words, in the period t7, the first pulse output circuit 20_1 outputs the low power supply potential (Vss) to the terminal 21 of the second pulse output circuit 20_2 and the scan line arranged in the first row in the pixel portion.

Next, the case where the high-level potential is input as the shift pulse from the k-th pulse output circuit 20_k to the terminal 21 of the (k+1)-th pulse output circuit 20_(k+1) will be described with reference to FIG. 9C.

Operation of the (k+1)-th pulse output circuit 20_(k+1) is as of the first pulse output circuit 20_1 in the periods t1 and t2. Therefore, the above description is to be referred to.

In the period t3, the levels of the signals input to the terminals are the same as in the period t2. Therefore, the potentials of the signals output from the terminals 25 and 27 are also not changed; the low-level potentials (low power supply potentials (Vss)) are output.

In the period t4, the high-level potentials (high power supply potentials (Vdd)) are input to the terminals 22 and 24. Note that the potential of the node A (the source potential of the transistor 31) has been increased to the high-level potential (potential that is decreased from the high power supply potential (Vdd) by the threshold voltage of the transistor 31) in the period t1. Therefore, the transistor 31 is off in the period t1. The input of the high-level potentials (high power supply potentials (Vdd)) to the terminals 22 and 24 further increases the potential of the node A (the potentials of the gates of the transistors 33 and 38) by capacitive coupling between the source and the gate of the transistor 33 and capacitive coupling between the source and the gate of the transistor 38 (bootstrapping). Owing to the bootstrapping, the potentials of the signals output from the terminals 25 and 27 are not decreased from the high-level potentials (high power supply potentials (Vdd)) input to the terminals 22 and 24, respectively. Accordingly, in the period t4, the (k+1)-th pulse output circuit 20_(k+1) outputs the high-level potentials (high power supply potentials (Vdd)=a selection signal and a shift pulse) to the scan line in the (k+1)-th row in the pixel portion and the terminal 21 of the (k+2)-th pulse output circuit 20 (k+2).

In the period t5, the levels of the signals input to the terminals are the same as in the period t4. Therefore, the potentials of the signals output from the terminals 25 and 27 are also not changed; the high-level potentials (high power supply potentials (Vdd)=the selection signal and the shift pulse) are output.

In the period t6, the low-level potential (low power supply potential (Vss)) is input to the terminal 24. In that period, the transistor 38 maintains the on state. Accordingly, in the period t6, the (k+1)-th pulse output circuit 20_(k+1) outputs the low-level potential (low power supply potential (Vss)) to the scan line arranged in the (k+1)-th row in the pixel portion.

In the period t7, the high-level potential (high power supply potential (Vdd)) is input to the terminal 23. Thus, the transistor 37 is on. As a result, the potential of the node B is increased to the high-level potential (potential that is decreased from the high power supply potential (Vdd) by the threshold voltage of the transistor 37). In other words, the transistors 32, 34, and 39 are on. On the other hand, the potential of the node A is decreased to the low-level potential (low power supply potential (Vss)). In other words, the transistors 33 and 38 are off. Accordingly, in the period t7, both of the signals output from the terminals 25 and 27 are at the low power supply potentials (Vss). In other words, in the period t7, the (k+1)-th pulse output circuit 20_(k+1) outputs the low power supply potential (Vss) to the terminal 21 of the (k+2)-th pulse output circuit 20_(k+2) and the scan line arranged in the (k+1)-th row in the pixel portion.

Next, the case where the high-level potential is input as the shift pulse from the 2k-th pulse output circuit 20_2k to the terminal 21 of the (2k+1)-th pulse output circuit 20_(2k+1) will be described below with reference to FIG. 9D.

Operation of the (2k+1)-th pulse output circuit 20_(2k+1) is as of the (k+1)-th pulse output circuit 20_(k+1) in the periods t1 to t3. Therefore, the above description is to be referred to.

In the period t4, the high-level potential (high power supply potential (Vdd)) is input to the terminal 22. Note that the potential of the node A (the source potential of the transistor 31) has been increased to the high-level potential (potential that is decreased from the high power supply potential (Vdd) by the threshold voltage of the transistor 31) in the period t1. Therefore, the transistor 31 is off in the period t1. The input of the high-level potential (high power supply potential (Vdd)) to the terminal 22 further increases the potential of the node A (the potential of the gate of the transistor 33) by capacitive coupling between the source and the gate of the transistor 33 (bootstrapping). Owing to the bootstrapping, the potential of the signal output from the terminal 27 is not decreased from the high-level potential (high power supply potential (Vdd)) input to the terminal 22. Accordingly, in the period t4, the (2k+1)-th pulse output circuit 20_(2k+1) outputs the high-level potential (high power supply potential (Vdd)=a shift pulse) to the terminal 21 of the (2k+2)-th pulse output circuit 20_(2k+2). Further, the low-level potential (low power supply potential (Vss)) is input to the terminal 21 to turn off the transistor 35, which does not directly influence the output signal of the pulse output circuit in the period t4.

In the period t5, the high-level potential (high power supply potential (Vdd)) is input to the terminal 24. As a result, since the potential of the node A has been increased by the bootstrapping, the potential of the signal output from the terminal 25 is not decreased from the high-level potential (high power supply potential (Vdd)) input to the terminal 24. Accordingly, in the period t5, the terminal 25 outputs the high-level potential (high power supply potential (Vdd)) which is input to the terminal 22. In other words, the (2k+1)-th pulse output circuit 20_(2k+1) outputs the high-level potential (high power supply potential (Vdd)=a selection signal) to the scan line arranged in the (2k+1)-th row in the pixel. In the period t5 also, the signal input to the terminal 22 maintains the high-level potential (high power supply potential (Vdd)), so that the signal output from the (2k+1)-th pulse output circuit 20_(2k+1) to the terminal 21 of the (2k+2)-th pulse output circuit 20_(2k+2) remains at the high-level potential (high power supply potential (Vdd) =the shift pulse).

In the period t6, the levels of the signals input to the terminals are the same as in the period t5. Therefore, the potentials of the signals output from the terminals 25 and 27 are also not changed: the high-level potentials (high power supply potentials (Vdd)=the selection signal and the shift pulse) are output.

In the period t7, the high-level potential (high power supply potential (Vdd)) is input to the terminal 73 Thus, the transistor 37 is on. As a result, the potential of the node B is increased to the high-level potential (potential that is decreased from the high power supply potential (Vdd) by the threshold voltage of the transistor 37). In other words, the transistors 32, 34, and 39 are on. On the other hand, the potential of the node A is decreased to the low-level potential (low power supply potential (Vss)). In other words, the transistors 33 and 38 are off. Accordingly, in the period t7, both of the signals output from the terminals 25 and 27 are at the low power supply potential (Vss). In other words, in the period t7, the (2k+1)-th pulse output circuit 20_(2k+1) outputs the low power supply potential (Vss) to the terminal 21 of the (2k+2)-th pulse output circuit 20_(2k+2) and the scan line arranged in the (2k+1)-th row in the pixel portion.

As illustrated in FIGS. 9B to 9D, with the first pulse output circuit 20_1 to the m-th pulse output circuit 20_m, a plurality of shift pulses can be shifted in parallel by controlling the timing of inputting the start pulse (GSP) for the scan line driver circuit. Specifically, after the start pulse (GSP) for the scan line driver circuit is input, the start pulse (GSP) for the scan line driver circuit is input again at the timing at which the terminal 27 of the k-th pulse output circuit 20_k outputs a shift pulse, whereby shift pulses can be output from the first pulse output circuit 20_1 and the (k+1)-th pulse output circuit 20_(k+1) at the same timing. The start pulse (GSP) for the scan line driver circuit can be further input in a similar manner, whereby shift pulses can be output from the first pulse output circuit 20_1, the (k+1)-th pulse output circuit 20_(k+1), and the (2k+1)-th pulse output circuit 20_(2k+1) at the same timing.

In addition, the first pulse output circuit 20_1, the (k+1)-th pulse output circuit 20(k+1), and the (2k+1)-th pulse output circuit 20_(2k+1) can supply selection signals to respective scan lines at different timings in parallel to the above-described operation. In other words, with the scan line driver circuit, a plurality of shift pulses including a specific shift period can be shifted several times, and a plurality of pulse output circuits to which shift pulses are input at the same timing can supply selection signals to their respective scan lines at different timings.

<Structure Example of Signal Line Driver Circuit 12>

Figure 10A:
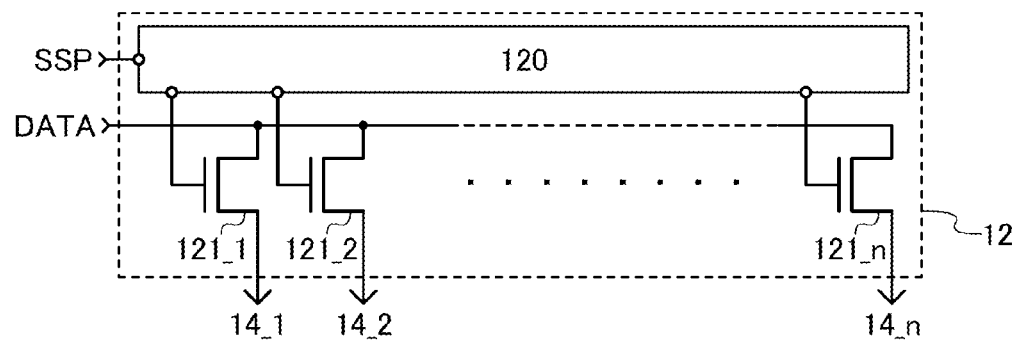
FIGS. 10A and 10B are diagrams to describe Embodiment 4.

FIG. 10A illustrates a structure example of the signal line driver circuit 12 included in the liquid crystal display device in FIG. 7A. The signal line driver circuit 12 illustrated in FIG. 10A includes a shift register 120 having first to n-th output terminals, a wiring for supplying an image signal (DATA), and transistors 121_1 to 121_n. One of a source and a drain of the transistor 121_1 is connected to the wiring for supplying the image signal (DATA), the other of the source and the drain of the transistor 121_1 is connected to the signal line 14_1 in the first column in the pixel portion, and a gate of the transistor 121_1 is connected to the first output terminal of the shift register 120. One of a source and a drain of the transistor 121_n is connected to the wiring for supplying the image signal (DATA), the other of the source and the drain of the transistor 121_n is connected to the signal line 14_n in the n-th column in the pixel portion, and a gate of the transistor 121_n is connected to the n-th output terminal of the shift register 120. The shift register 120 outputs the high-level potential sequentially from the first to n-th output terminals per shift period, when a high-level potential is input as a start pulse for the signal line driver circuit (SSP). In other words, the transistors 121_1 to 121_n are sequentially turned on per shift period.

Figure 10B:
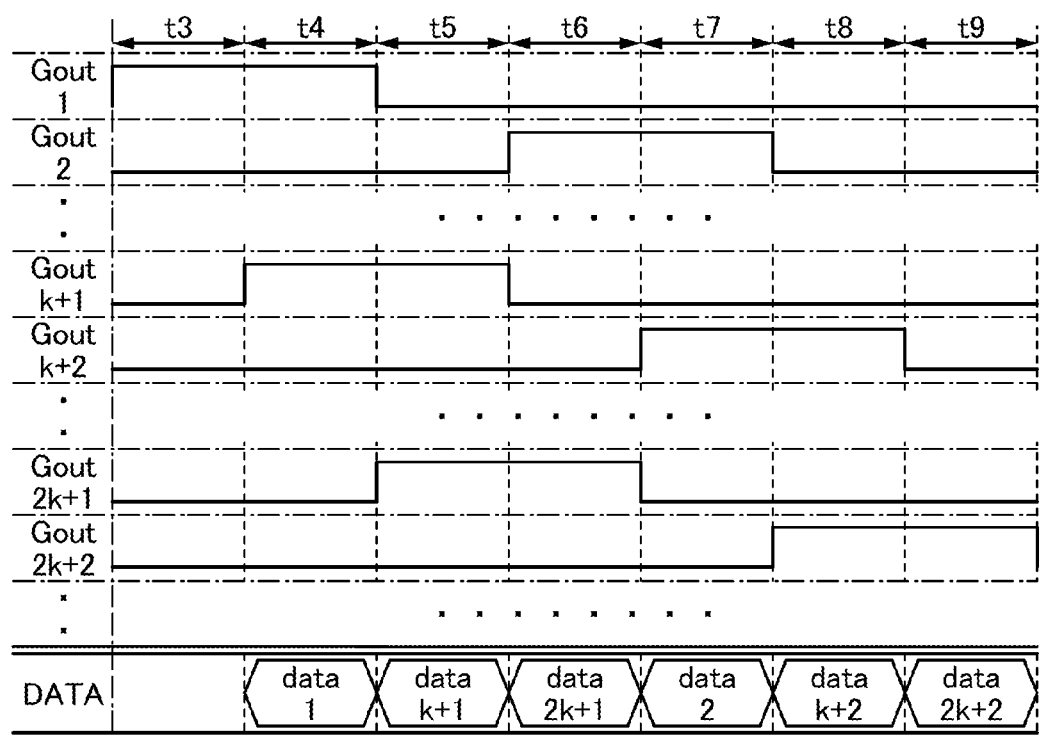

FIG. 10B illustrates an example of timing of image signals which are supplied through the wiring for supplying the image signal (DATA). As illustrated in FIG. 10B, the wiring for supplying the image signal (DATA) supplies an image signal for a pixel provided in the first row (data 1) in the period t4; an image signal for a pixel provided in the (k+1)-th row (data k+1) in the period t5; an image signal for a pixel provided in the (2k+1)-th row (data 2k+1) in the period t6; and an image signal for a pixel provided in the second row (data 2) in the period t7. In this manner, the wiring for supplying the image signal (DATA) supplies image signals for pixels arranged in respective rows sequentially. Specifically, image signals are supplied in the following order: an image signal for a pixel provided in the s-th row (s is a natural number less than k)→an image signal for a pixel provided in the (k+s)-th row→an image signal for a pixel provided in the (2k+s)-th row→an image signal for a pixel provided in the (s+1)-th row. According to the above-described operation of the scan line driver circuit and the signal line driver circuit, the image signals can be input to the pixels in three rows provided in the pixel portion per shift period of the pulse output circuit in the scan line driver circuit.

<Structure Example of Backlight>

Figure 11:
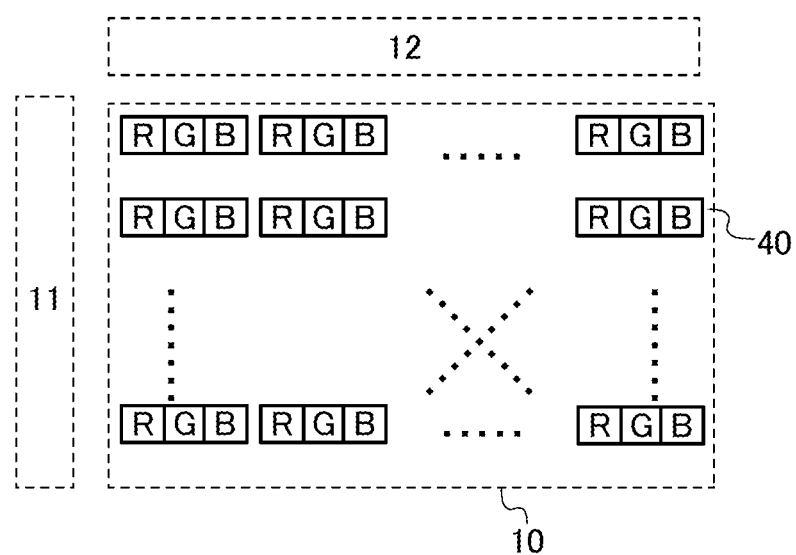
FIG. 11 is a diagram to describe Embodiment 4.

FIG. 11 illustrates a structure example of a backlight provided behind the pixel portion 10 in the liquid crystal display device illustrated in FIG. 7A. The backlight illustrated in FIG. 11 includes a plurality of backlight units 40 each including a light source that emits red (R) light, a light source that emits green (G) light, and a light source that emits blue (B) light. The plurality of backlight units 40 is arranged in a matrix, and can be controlled to be turned on per unit region. Here, the backlight unit 40 is provided at least every t rows and n columns (here, t is k/4) as the backlight for the plurality of pixels 15 provided in the m rows and the n columns, and lighting of the backlight units 40 can be controlled independently. In other words, the backlight includes at least a backlight unit for the first to t-th rows to a backlight unit for the (2k+3t+1)-th to m-th rows, and the lighting of the backlight units 40 can be controlled independently. Further, in the backlight unit 40, the lighting of each of the light source that emits red (R) light, the light source that emits green (G) light, and the light source that emits blue (B) light can also be controlled independently. In other words, in the backlight unit 40, red (R) light, green (G) light, or blue (B) light can be delivered to the pixel portion 10 by turning on any one of the light source that emits red (R) light, the light source that emits green (G) light, and the light source that emits blue (B) light; mixed color light formed by a mixture of lights of two colors can be delivered to the pixel portion 10 by turning on any two of the light source that emits red (R) light, the light source that emits green (G) light, the light source that emits blue (B) light; and white (W) light formed by a mixture of lights of three colors can be delivered to the pixel portion 10 by turning on all the light source that emits red (R) light, the light source that emits green (G) light, and the light source that emits blue (B) light.

<Operation Example of Liquid Crystal Display Device>

Figure 12:
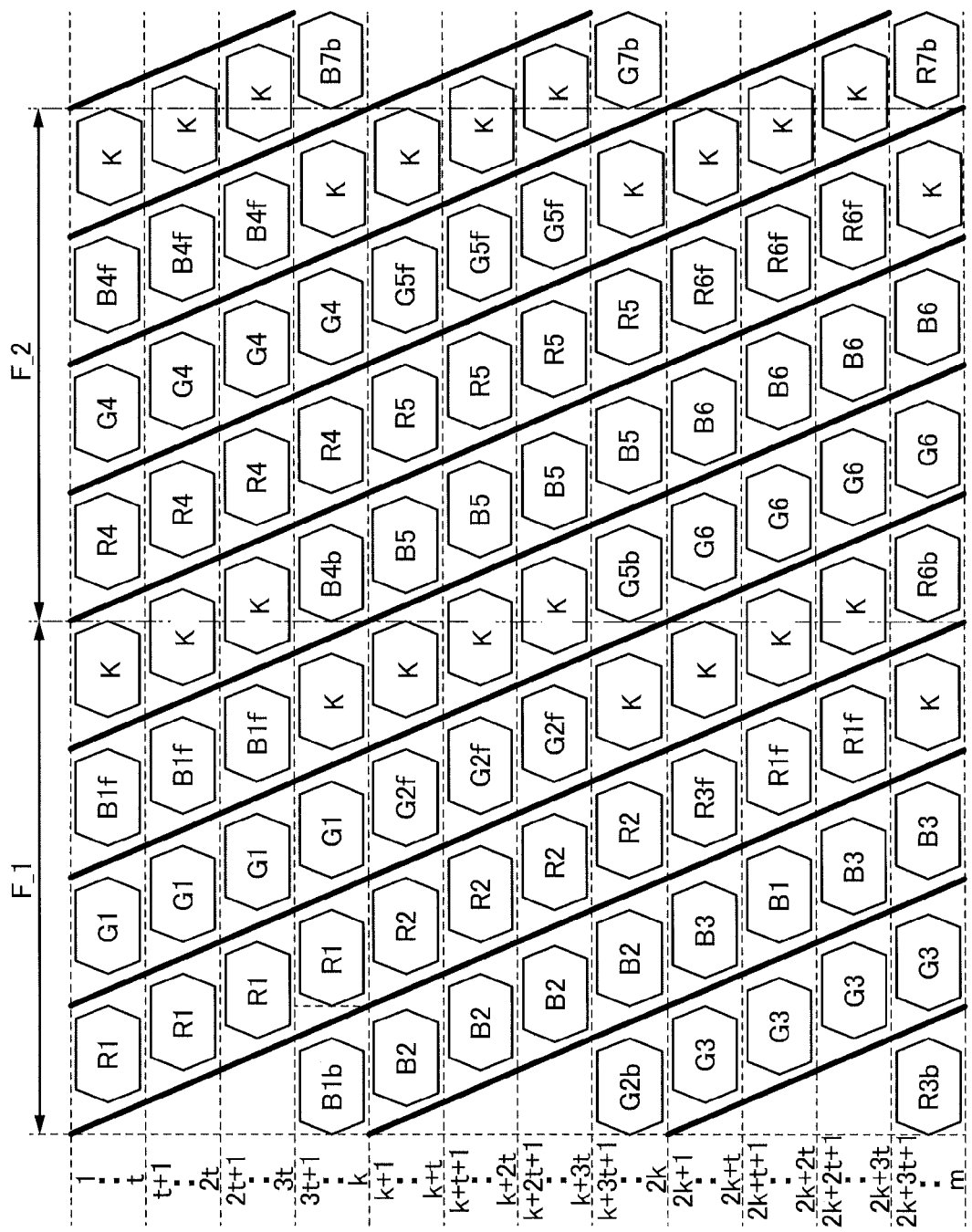
FIG. 12 is a diagram to describe Embodiment 4.

FIG. 12 illustrates timing of scanning selection signals in the liquid crystal display device and timing of lighting the backlight unit for the first to t-th rows to the backlight unit for the (2k+31+1)-th to m-th rows included in the backlight. Note that the vertical axis represents rows (first to in-th rows) in the pixel portion, and the horizontal axis represents time in FIG. 12. As illustrated in FIG. 12, in the liquid crystal display device, selection signals are not sequentially input to the scan lines arranged in the first to the m-th rows but are sequentially input to the rows which are spaced by k rows (e.g., in the following order: the scan line provided in the first row→the scan line provided in the (k+1)-th row→the scan line provided in the (2k+1)-th row→the scan line provided in the second row). Note that FIG. 12 illustrates a structure of timings of writing of image signals and lighting of the light sources in the case where the black display period described in Embodiment 2 is provided. Therefore, crosstalk between consecutive frames can be more surely reduced in a manner similar to that in Embodiment 2.

This embodiment can be implemented in appropriate combination with the structures described in the other embodiments.

(Embodiment 5)

In this embodiment, an example of a block diagram for driving a display device will be described.

Figure 13:
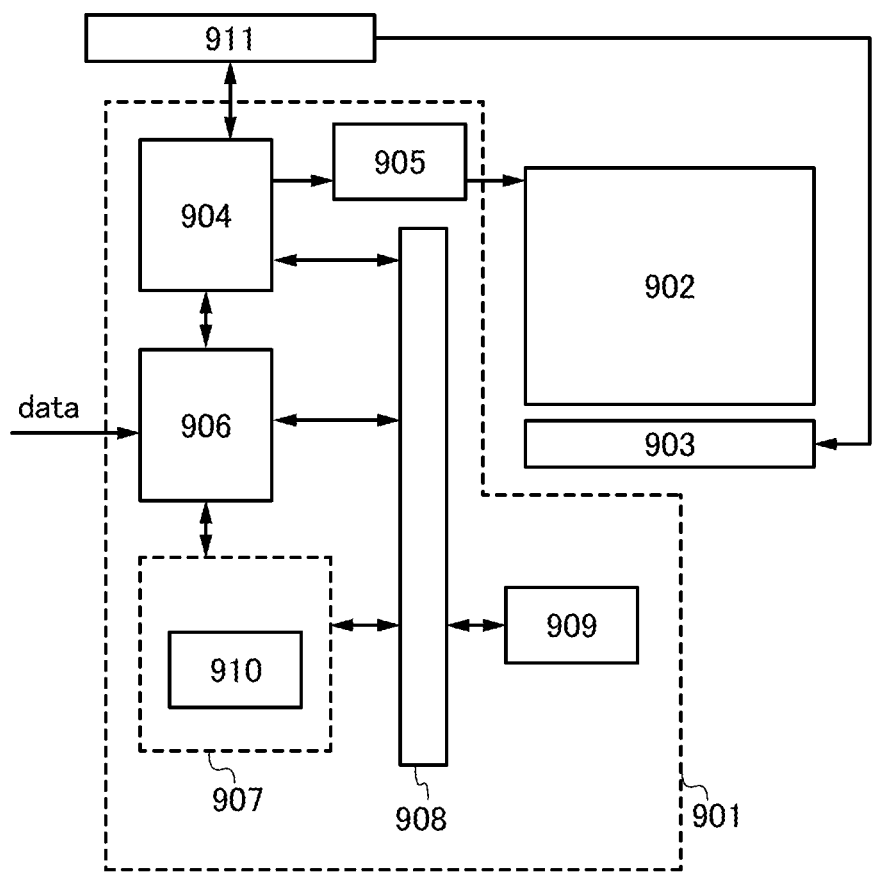
FIG. 13 is a diagram to describe Embodiment 5.

In a block diagram in FIG. 13, an image signal processing circuit 901, a display panel 902, and a backlight unit 903 are illustrated.

The image signal processing circuit 901 includes a display control circuit 904, a panel control circuit 905, a format conversion circuit 906, a 2D/3D image signal conversion circuit 907, a memory control circuit 908, and a frame memory 909.

In the image signal processing circuit 901, an image signal (data) is supplied to the format conversion circuit 906 from the outside, and format conversion is performed in accordance with a format of the image signal (data). The 2D/3D image signal conversion circuit 907 converts the image signal which is subjected to format conversion in the format conversion circuit 906 to an image signal for displaying a planar view or an image signal for displaying a stereoscopic image, based on an image signal conversion memory 910 provided inside the 2D/3D image signal conversion circuit 907. The image signal converted in the 2D/3D image signal conversion circuit 907 is stored in the frame memory 909 through the memory control circuit 908. The image signal stored in the frame memory 909 is read out by the display control circuit 904 through the memory control circuit 908. Then, the display control circuit 904 outputs a signal for the panel control circuit 905 to control the display panel 902.

Further, in the backlight unit 903, lighting of the light sources is controlled by a backlight unit control circuit 911. The backlight unit control circuit 911 is controlled by the display control circuit 904.

As discussed above, with the structure of the block diagram of this embodiment, the driving method of a display device described in any of Embodiments 1 and 2 can be realized.

This embodiment can be implemented in appropriate combination with the structures described in the other embodiments.

(Embodiment 6)

In this embodiment, the appearance and a cross section of the liquid crystal display device described in Embodiment 4 will be described.

Figure 14B:
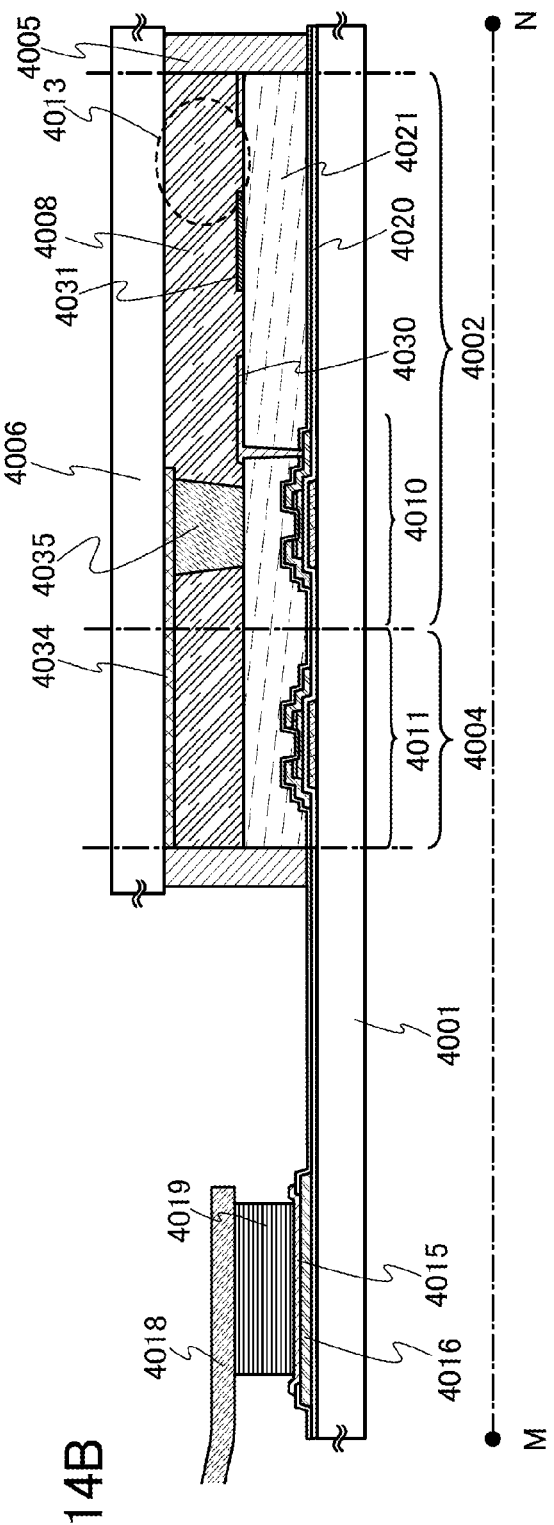

The appearance and a cross section of the liquid crystal display device will be described with reference to FIGS. 14A1, 14A2, and 14B. FIGS. 14A1 and 14A2 are top views of panels in which transistors 4010 and 4011 and a liquid crystal element 4013 which are formed over a first substrate 4001 are sealed between the first substrate 4001 and a second substrate 4006 with a sealant 4005. FIG. 14B is a cross-sectional view taken along line M-N of FIGS. 14A1 and 14A2.

The sealant 4005 is provided so as to surround a pixel portion 4002 and a scan line driver circuit 4004 which are provided over the first substrate 4001. In addition, the second substrate 4006 is provided over the pixel portion 4002 and the scan line driver circuit 4004. Therefore, the pixel portion 4002 and the scan line driver circuit 4004 are sealed together with a liquid crystal layer 4008, by the first substrate 4001, the sealant 4005, and the second substrate 4006.

In FIG. 14A1, a signal line driver circuit 4003 that is formed using a single crystal semiconductor film or a polycrystalline semiconductor film over a substrate separately prepared is mounted in a region that is different from the region surrounded by the sealant 4005 over the first substrate 4001. In contrast, FIG. 14A2 illustrates an example in which part of a signal line driver circuit is formed over the first substrate 4001 with the use of a transistor which includes an oxide semiconductor. A signal line driver circuit 4003b is formed over the first substrate 4001 and a signal line driver circuit 4003a which is formed using a single crystal semiconductor film or a polycrystalline semiconductor film is mounted on the substrate separately prepared.

Note that there is no particular limitation on the connection method of a driver circuit which is separately formed, and a COG method, a wire bonding method, a TAB method, or the like can be used. FIG. 14A1 illustrates an example of mounting the signal line driver circuit 4003 by a COG method, and FIG. 14A2 illustrates an example of mounting the signal line driver circuit 4003 by a TAB method.

The pixel portion 4002 and the scan line driver circuit 4004 provided over the first substrate 4001 include a plurality of transistors. FIG. 14B illustrates the transistor 4010 included in the pixel portion 4002 and the transistor 4011 included in the scan line driver circuit 4004, as an example. An insulating layer 4020 and an insulating layer 4021 are provided over the transistors 4010 and 4011.

Various kinds of transistors can be applied to the transistors 4010 and 4011 without particular limitation. A semiconductor formed using silicon (for example, amorphous silicon, microcrystalline silicon, or polysilicon) or an oxide semiconductor can be used for a channel layer of each of the transistors 4010 and 4011.

A pixel electrode layer 4030 and a common electrode layer 4031 are provided over the first substrate 4001, and the pixel electrode layer 4030 is connected to the transistor 4010. The liquid crystal element 4013 includes the pixel electrode layer 4030, the common electrode layer 4031, and the liquid crystal layer 4008.

In a liquid crystal display device including the liquid crystal layer 4008 which exhibits a blue phase, a method in which the gray scale is controlled by generating an electric field generally parallel (i.e., in a lateral direction) to a substrate to move liquid crystal molecules in a plane parallel to the substrate can be used. For such a method, an electrode structure used in an in plane switching (IPS) mode illustrated in FIGS. 14A1 and 14A2 and FIG. 14B is employed in this embodiment. Note that without limitation to an IPS mode, an electrode structure used in a fringe field switching (FFS) mode can also be employed. In addition, a structure of bend alignment liquid crystals which are controlled by a transverse electric field (also referred to as transverse bend alignment (TBA)) may be used for the liquid crystal layer 4008.

As the first substrate 4001 and the second substrate 4006, glass, plastic, or the like having a light-transmitting property can be used. As plastic, poly(ether sulfone) (PES), polyimide, a fiberglass-reinforced plastic (FRP) plate, a polyvinyl fluoride (PVF) film, a polyester film, or an acrylic resin film can be used. In addition, a sheet with a structure in which an aluminum foil is sandwiched between PVF films or polyester films can be used.

Furthermore, a columnar spacer 4035 which is provided in order to control the thickness (a cell gap) of the liquid crystal layer 4008 can be obtained by selective etching of an insulating film. Note that a spherical spacer may be used instead of the columnar spacer 4035.

In FIGS. 14A1 and 14A2 and FIG. 14B, a light-blocking layer 4034 is provided on the second substrate 4006 side so as to cover the transistors 4010 and 4011. With provision of the light-blocking layer 4034, the advantageous effect of stabilizing characteristics of the transistors can be increased. The light-blocking layer 4034 may be provided over the first substrate 4001. In this case, when polymer stabilization is performed by irradiation with ultraviolet rays from the second substrate 4006 side, a liquid crystal over the light-blocking layer 4034 can also be polymer-stabilized when it exhibits a blue phase.

The transistors 4010 and 4011 can be, but is not necessarily, covered with the insulating layer 4020 which functions as a protective film of the transistors 4010 and 4011.

Note that the protective film is provided to prevent entry of contaminant impurities such as organic substance, metal, or moisture existing in air and is preferably a dense film. The protective film may be formed with a single layer or a stacked layer of a silicon oxide film, a silicon nitride film, a silicon oxynitride film, a silicon nitride oxide film, an aluminum oxide film, an aluminum nitride film, an aluminum oxynitride film, and/or an aluminum nitride oxide film by a sputtering method.

After the protective film is formed, the semiconductor layer may be subjected to heat treatment (300° C. to 400° C.).

The pixel electrode layer 4030 and the common electrode layer 4031 can be made of a light-transmitting conductive material such as indium oxide containing tungsten oxide, indium zinc oxide containing tungsten oxide, indium oxide containing titanium oxide, indium tin oxide containing titanium oxide, indium tin oxide (ITO), indium zinc oxide, or indium tin oxide to which silicon oxide is added.

A conductive composition containing a conductive high molecule (also referred to as a conductive polymer) can be used for the pixel electrode layer 4030 and the common electrode layer 4031.

Further, a variety of signals and a potential are supplied to the signal line driver circuit 4003 which is formed separately, the scan line driver circuit 4004, and the pixel portion 4002 from an FPC 4018.

Further, since the transistor is easily broken by static electricity and the like, a protection circuit for protecting the driver circuits is preferably provided over the same substrate for a gate line or a source line. The protection circuit is preferably formed with a non-linear element including an oxide semiconductor.

In FIGS. 14A1, 14A2, and 14B, a connection terminal electrode 4015 is formed using the same conductive film as that of the pixel electrode layer 4030, and a terminal electrode 4016 is formed using the same conductive film as that of source and drain electrode layers of the transistors 4010 and 4011.

The connection terminal electrode 4015 is connected to a terminal included in the FPC 4018 via an anisotropic conductive film 4019.

Note that FIGS. 14A1, 14A2, and 14B illustrate an example in which the signal line driver circuit 4003 is formed separately and mounted on the first substrate 4001; however, this embodiment is not limited to this structure. The scan line driver circuit may be formed separately and then mounted, or only part of the signal line driver circuit or part of the scan line driver circuit may be formed separately and then mounted.

Figure 15:
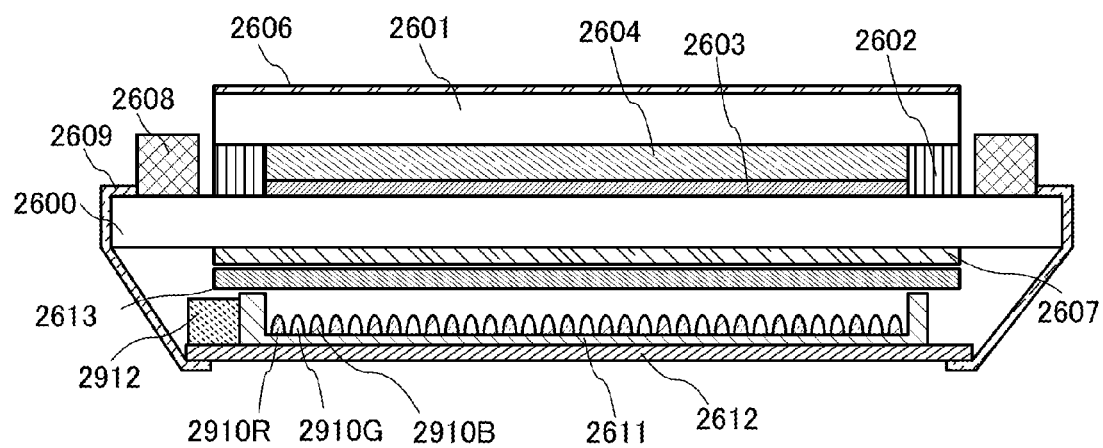
FIG. 15 is a diagram to describe Embodiment 6.

FIG. 15 illustrates an example of a cross-sectional structure of a liquid crystal display device in which an element substrate 2600 and a counter substrate 2601 are attached to each other with a sealant 2602, and an element layer 2603 including a transistor or the like and a liquid crystal layer 2604 are provided between the substrates.

In order to perform color scan backlight driving described in the above embodiment, light-emitting diodes emitting lights of a plurality of colors are provided as light sources of a backlight unit. For realizing the lights of a plurality of colors, a red light-emitting diode 2910R, a green light-emitting diode 2910G, and a blue light-emitting diode 2910B are used.

A polarizing plate 2606 is provided on the outer side of the counter substrate 2601, and a polarizing plate 2607 and a diffusion sheet 2613 are provided on the outer side of the element substrate 2600. A light source is formed using the red light-emitting diode 2910R, the green light-emitting diode 2910G, the blue light-emitting diode 2910B, and a reflective plate 2611. A backlight drive control circuit 2912 provided for a circuit substrate 2612 is connected to a wiring circuit portion 2608 of the element substrate 2600 via a flexible wiring board 2609 and further includes an external circuit such as a control circuit or a power source circuit.

The light source of the backlight unit can be controlled by the backlight drive control circuit 2912 so as to emit lights of different colors per region.

This embodiment can be implemented in appropriate combination with the structures described in the other embodiments.

(Embodiment 7)

A display device disclosed in this specification can be applied to a variety of electronic devices (including game machines). Examples of electronic devices are a television set (also referred to as a television or a television receiver), a monitor of a computer or the like, a camera such as a digital camera or a digital video camera, a digital photo frame, a mobile phone handset (also referred to as a mobile phone or a mobile phone device), a portable game machine, a portable information terminal, an audio reproducing device, a large-sized game machine such as a pachinko machine, and the like. Examples of electronic devices each including the display device described in any of the above embodiments will be described.

Figure 16A:
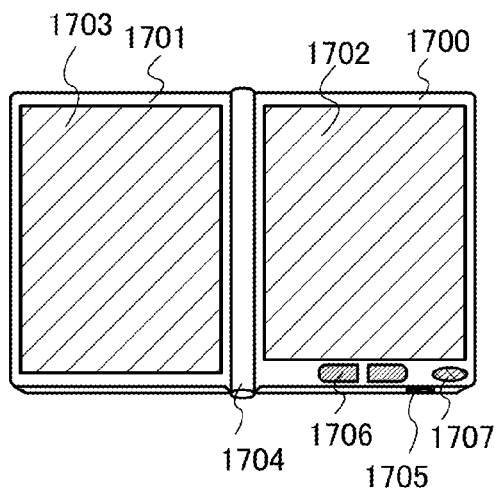
FIGS. 16A to 16D are diagrams to describe Embodiment 7.

FIG. 16A illustrates an example of the electronic book readers. The electronic book reader illustrated in FIG. 16A includes two housings, a housing 1700 and a housing 1701. The housing 1700 and the housing 1701 are combined with a hinge 1704 so that the electronic book reader can be opened and closed. With such a structure, the electronic book reader can be operated like a paper book.

A display portion 1702 and a display portion 1703 are incorporated in the housing 1700 and the housing 1701, respectively. The display portion 1702 and the display portion 1703 may be configured to display one image or different images. In the case where the display portion 1702 and the display portion 1703 display different images, for example, a display portion on the right side (the display portion 1702 in FIG. 16A) can display text and a display portion on the left side (the display portion 1703 in FIG. 16A) can display graphics.

Further, FIG. 16A illustrates an example in which the housing 1700 is provided with an operation portion and the like. For example, the housing 1700 is provided with a power supply input terminal 1705, an operation key 1706, a speaker 1707, and the like. With the operation key 1706, pages can be turned. Note that a keyboard, a pointing device, or the like may be provided on the surface of the housing, on which the display portion is provided. Further, an external connection terminal (an earphone terminal, a USB terminal, a terminal that can be connected to various cables such as a USB cable, or the like), a recording medium insertion portion, or the like may be provided on the back surface or the side surface of the housing. Further, a function of an electronic dictionary may be provided for the electronic book reader illustrated in FIG. 16A.

Figure 16B:
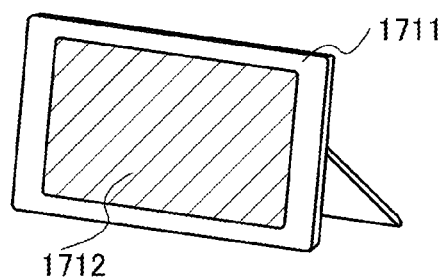

FIG. 16B illustrates an example of a digital photo frame including a display device. For example, in the digital photo frame illustrated in FIG. 16B, a display portion 1712 is incorporated in a housing 1711. The display portion 1712 can display various images. For example, the display portion 1712 can display data of an image taken with a digital camera or the like and function as a normal photo frame.

Note that the digital photo frame illustrated in FIG. 16B may be provided with an operation portion, an external connection terminal (a USB terminal, a terminal that can be connected to various cables such as a USB cable, or the like), a recording medium insertion portion, and the like. Although these components may be provided on the surface on which the display portion is provided, it is preferable to provide them on the side surface or the back surface for the design of the digital photo frame. For example, a memory storing data of an image taken with a digital camera is inserted in the recording medium insertion portion of the digital photo frame, whereby the image data can be transferred and then displayed on the display portion 1712.

Figure 16C:
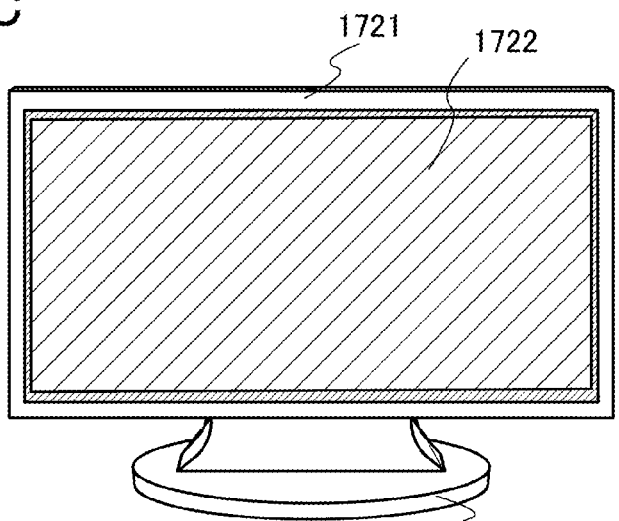

FIG. 16C illustrates an example of a television set including a display device. In the television set illustrated in FIG. 16C, a display portion 1722 is incorporated in a housing 1721. The display portion 1722 can display an image. Further, the housing 1721 is supported by a stand 1723 here. The display device described in any of the above embodiments can be used in the display portion 1722.

The television set illustrated in FIG. 16C can be operated with an operation switch of the housing 1721 or a separate remote controller. Channels and volume can be controlled with an operation key of the remote controller so that an image displayed on the display portion 1722 can be controlled. Further, the remote controller may be provided with a display portion for displaying data output from the remote controller.

Figure 16D:
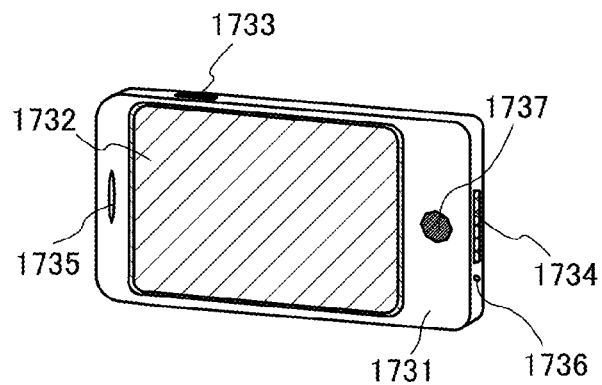

FIG. 16D illustrates an example of a mobile phone handset including a display device. The mobile phone handset illustrated in FIG. 16D is provided with a display portion 1732 incorporated in a housing 1731, an operation button 1733, an operation button 1737, an external connection port 1734, a speaker 1735, a microphone 1736, and the like.

The display portion 1732 of the mobile phone handset illustrated in FIG. 16D is a touch panel. By touching the display portion 1732 with a finger or the like, contents displayed on the display portion 1732 can be controlled. Further, operations such as making calls and texting can be performed by touching the display portion 1732 with a finger or the like.

This embodiment can be implemented in appropriate combination with the structures described in the other embodiments.

This application is based on Japanese Patent Application serial no. 2010-267058 filed with Japan Patent Office on Nov. 30, 2010, the entire contents of which are hereby incorporated by reference.

What is claimed is:

1. A driving method of a display device, the display device comprising a first display region and a second display region, comprising the steps of:
    writing a first image signal of a first image in the first display region in a first sub-frame period of a first frame period;
    turning on a first light source corresponding to the first image signal in the first display region in the first sub-frame period of the first frame period;
    turning on a second light source corresponding to the first image signal in the second display region in the first sub-frame period of the first frame period;
    writing the first image signal of the first image in the first display region in a second sub-frame period of the first frame period;
    turning on the second light source corresponding to the first image signal in the first display region in the second sub-frame period of the first frame period;
    writing a second image signal of a second image in the second display region in the second sub-frame period of the first frame period; and
    turning on the second light source corresponding to the second image signal in the second display region in a first sub-frame period of a second frame period,
    wherein the first image is displayed in the first frame period and the second image is displayed in the second frame period,
    wherein lighting periods corresponding to the first image signal and lighting periods corresponding to the second image signal do not overlap with each other, and
    wherein a color of light emitted from the first light source is different from a color of light emitted from the second light source.

2. The driving method of a display device according to claim 1, wherein the second sub-frame period of the first frame period is a sub-frame period adjacent to the second frame period.

3. The driving method of a display device according to claim 1, wherein the first sub-frame period of the second frame period is a sub-frame period adjacent to the first frame period.

4. The driving method of a display device according to claim 1, wherein the first light source is a light source of red, a light source of green, or a light source of blue.

5. The driving method of a display device according to claim 1, wherein the second light source is a light source of red, a light source of green, or a light source of blue.

6. The driving method of a display device according to claim 1, wherein the first image is an image for one of a left eye and a right eye, and the second image is an image for the other of the left eye and the right eye.

7. A driving method of a display device, the display device comprising a first display region and a second display region, comprising the steps of:
    writing a first image signal of a first image in the first display region in a first sub-frame period of a first frame period;
    turning on a first light source corresponding to the first image signal in the first display region in the first sub-frame period of the first frame period;
    turning on a second light source corresponding to the first image signal in the second display region in the first sub-frame period of the first frame period;
    writing the first image signal of the first image in the first display region in a second sub-frame period of the first frame period;
    turning on the second light source corresponding to the first image signal in the first display region in the second sub-frame period of the first frame period;
    writing a second image signal of a second image in the second display region in the second sub-frame period of the first frame period; and
    turning on the second light source corresponding to the second image signal in the second display region in a first sub-frame period of a second frame period,
    wherein any one of scan lines in the first display region and any one of scan lines in the second display region are selected at the same time,
    wherein the first image is displayed in the first frame period and the second image is displayed in the second frame period,
    wherein a third light source in the first display region emits light in the first frame period, wherein lighting periods corresponding to the first image signal and lighting periods corresponding to the second image signal do not overlap with each other, and wherein a color of light emitted from the first light source, a color of light emitted from the second light source, and a color of light emitted from the third light source are different from one another.

8. The driving method of a display device according to claim 7, wherein the second sub-frame period of the first frame period is a sub-frame period adjacent to the second frame period.

9. The driving method of a display device according to claim 7, wherein the first sub-frame period of the second frame period is a sub-frame period adjacent to the first frame period.

10. The driving method of a display device according to claim 7, wherein the first light source is a light source of red, a light source of green, or a light source of blue.

11. The driving method of a display device according to claim 7, wherein the second light source is a light source of red, a light source of green, or a light source of blue.

12. The driving method of a display device according to claim 7, wherein the first image is an image for one of a left eye and a right eye, and the second image is an image for the other of the left eye and the right eye.

13. A driving method of a display device, the display device comprising a first display region and a second display region, comprising the steps of:

writing a first image signal of a first image in the first display region in a first sub-frame period of a first frame period;

turning on a first light source corresponding to the first image signal in the first display region in the first sub-frame period of the first frame period;

turning on a second light source corresponding to the first image signal in the second display region in the first sub-frame period of the first frame period;

writing the first image signal of the first image in the first display region in a second sub-frame period of the first frame period;

turning on the second light source corresponding to the first image signal in the first display region in the second sub-frame period of the first frame period;

writing a first black image signal for black display in the second display region in the second sub-frame period of the first frame period;

turning off the second light source in the second display region in a third sub-frame period of the first frame period;

writing a second black image signal for black display in the first display region in the third sub-frame period of the first frame period;

turning off the first light source in the first display region in the third sub-frame period of the first frame period;

writing a second image signal of a second image in the second display region in the third sub-frame period of the first frame period; and turning on the second light source corresponding to the second image signal in the second display region in a first sub-frame period of a second frame period, wherein any one of scan lines in the first display region and any one of scan lines in the second display region are selected at the same time, wherein the first image is displayed in the first frame period and the second image is displayed in the second frame period, wherein a third light source in the first display region emits light in the first frame period, wherein lighting periods corresponding to the first image signal and lighting periods corresponding to the second image signal do not overlap with each other, and wherein a color of light emitted from the first light source, a color of light emitted from the second light source, and a color of light emitted from the third light source are different from one another.

14. The driving method of a display device according to claim 13, wherein the third sub-frame period of the first frame period is a sub-frame period adjacent to the second frame period.

15. The driving method of a display device according to claim 13, wherein the first sub-frame period of the second frame period is a sub-frame period adjacent to the first frame period.

16. The driving method of a display device according to claim 13, wherein the first light source is a light source of red, a light source of green, or a light source of blue.

17. The driving method of a display device according to claim 13, wherein the second light source is a light source of red, a light source of green, or a light source of blue.

18. The driving method of a display device according to claim 13, wherein the first image is an image for one of a left eye and a right eye, and the second image is an image for the other of the left eye and the right eye.

19. A driving method of a display device, the display device comprising a first display region and a second display region, comprising the steps of:

writing a first image signal of a first image for one of a left eye and a right eye in the first display region in a first sub-frame period of a first frame period;

turning on a first light source corresponding to the first image signal in the first display region in the first sub-frame period of the first frame period;

turning on a second light source corresponding to the first image signal in the second display region in the first sub-frame period of the first frame period;

writing the first image signal of the first image in the first display region in a second sub-frame period of the first frame period;

turning on the second light source corresponding to the first image signal in the first display region in the second sub-frame period of the first frame period;

writing a second image signal of a second image for the other of the left eye and the right eye in the second display region in the second sub-frame period of the first frame period; and turning on the second light source corresponding to the second image signal in the second display region in a first sub-frame period of a second frame period, wherein the first image is displayed in the first frame period and the second image is displayed in the second frame period, wherein lighting periods corresponding to the first image signal and lighting periods corresponding to the second image signal do not overlap with each other, wherein transmission and non-transmission of each of a left eye shutter and a right eye shutter of glasses are switched between the first frame period and the second frame period, and wherein a color of light emitted from the first light source is different from a color of light emitted from the second light source.

20. The driving method of a display device according to claim 19, wherein a stereoscopic image is displayed.

21. The driving method of a display device according to claim 19, wherein the first light source is a light source of red, a light source of green, or a light source of blue.

22. The driving method of a display device according to claim 19, wherein the second light source is a light source of red, a light source of green, or a light source of blue.

* * * * *